US010447426B2

(12) United States Patent
Sundararajan et al.

(10) Patent No.: US 10,447,426 B2
(45) Date of Patent: Oct. 15, 2019

(54) SCHEDULING BASED ON END-TO-END DELAY BOUND

(71) Applicant: QUALCOMM Incorporated, San Diego, CA (US)

(72) Inventors: Jay Kumar Sundararajan, San Diego, CA (US); Jing Jiang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 15/197,696

(22) Filed: Jun. 29, 2016

(65) Prior Publication Data
US 2017/0164404 A1     Jun. 8, 2017

Related U.S. Application Data

(60) Provisional application No. 62/263,502, filed on Dec. 4, 2015.

(51) Int. Cl.
*H04L 1/00* (2006.01)
*H04L 29/06* (2006.01)
(Continued)

(52) U.S. Cl.
CPC .......... *H04L 1/0018* (2013.01); *H04B 1/713* (2013.01); *H04L 5/003* (2013.01); *H04L 47/283* (2013.01);
(Continued)

(58) Field of Classification Search
CPC ....... H04W 4/005; H04W 4/80; H04W 84/18; H04W 40/04–18; H04W 72/1221; H04L 47/28–47/30
See application file for complete search history.

(56) References Cited

U.S. PATENT DOCUMENTS 7,489,690 B2    2/2009  Kakadia et al.
8,854,418 B2   10/2014  Li et al.
(Continued)

FOREIGN PATENT DOCUMENTS

WO    WO-2007008123 A1    1/2007
WO    WO-2008156382 A1   12/2008
WO    WO-2011062655       5/2011

OTHER PUBLICATIONS

Alcatel: "Buffer Status Definition based on Bounded Time-delay Requirement in EUL," 3GPP Draft; R2-042496, 3rd Generation Partnership Project (3GPP), Mobile Competence Centre : 650, Route Des Lucioles ; F-06921 Sophia-Antipolis Cedex ; France, vol. RAN WG2, No. Yokohama, Japan; Nov. 12, 2004, Nov. 12, 2004 (Nov. 12, 2004), XP050127054 [retrieved on Nov. 12, 2004].
(Continued)

*Primary Examiner* — Marcus Smith
(74) *Attorney, Agent, or Firm* — Loza & Loza LLP

(57) ABSTRACT

The disclosure relates in some aspects to scheduling data transmissions based on an end-to-end delay bound. In some aspects, timing information is transmitted in conjunction with data over a given hop, where the timing information is based on an end-to-end delay bound for the data transmission (e.g., according to a latency requirement). For example, the timing information may indicate the time remaining for transmission of a response to the data or the deadline for completing the response. A scheduler that receives the timing information may schedule another transmission (e.g., a response) based on the timing information.

26 Claims, 19 Drawing Sheets

(51) Int. Cl.
  *H04W 28/02* (2009.01)
  *H04L 12/841* (2013.01)
  *H04B 1/713* (2011.01)
  *H04L 5/00* (2006.01)
  *H04W 88/02* (2009.01)
  *H04W 88/08* (2009.01)
  *H04W 88/12* (2009.01)

(52) U.S. Cl.
  CPC ............. *H04L 69/28* (2013.01); *H04W 28/02* (2013.01); *H04L 5/0091* (2013.01); *H04W 88/02* (2013.01); *H04W 88/08* (2013.01); *H04W 88/12* (2013.01)

(56) References Cited

U.S. PATENT DOCUMENTS

| | | |
|---|---|---|
| 2009/0196275 A1 | 8/2009 | Damnjanovic et al. |
| 2014/0302846 A1* | 10/2014 | Zou .................... H04W 4/70 455/435.1 |
| 2014/0328263 A1 | 11/2014 | Chung et al. |
| 2014/0369245 A1* | 12/2014 | Pecen ............... H04W 52/0212 370/311 |
| 2015/0207728 A1 | 7/2015 | Gagliano et al. |
| 2015/0319771 A1* | 11/2015 | Hill ....................... H04W 4/70 370/330 |
| 2015/0358113 A1 | 12/2015 | Callard et al. |
| 2016/0286487 A1* | 9/2016 | Sachs ............... H04W 52/0216 |
| 2018/0098299 A1* | 4/2018 | Chae ....................... H04J 11/00 |

OTHER PUBLICATIONS

International Search Report and Written Opinion—PCT/US2016/063580—ISA/EPO—Feb. 13, 2017.
LG Electronics Inc: "Scheduling Function in MAC-hs," 3GPP Draft; R2-020078 Scheduling Function in MAC-HS, 3rd Generation Partnership Project (3GPP), Mobile Competence Centre ; 650, Route Des Lucioles ; 1-06921 Sophia-Antipolis Cedex ; France, vol. RAN WG2, No. Sophia Antipolis, France; Jan. 7, 2002 Jan. 1, 2002 (Jan. 7, 2002), XP050119660, [retrieved on Jan. 7, 2002].
QUALCOMM Europe: "Happy Bits", 3GPP TSG-RAN WG2 #61, R2-081065, Feb. 11, 2008, 2 pages.

* cited by examiner

SCHEDULING BASED ON END-TO-END DELAY BOUND

CROSS-REFERENCE TO RELATED APPLICATION(S)

This application claims priority to and the benefit of provisional patent application No. 62/263,502 filed in the U.S. Patent and Trademark Office on Dec. 4, 2015, the entire content of which is incorporated herein by reference.

INTRODUCTION

Aspects of the present disclosure relate generally to wireless communication and more particularly, but not exclusively, to techniques for scheduling communication associated with an end-to-end delay bound.

Wireless communication networks are widely deployed to provide various communication services such as telephony, video, data, messaging, broadcasts, and so on. Such networks, which are usually multiple access networks, support communications for multiple users by sharing the available network resources.

As the demand for mobile broadband access continues to increase, research and development continue to advance wireless communication technologies not only to meet the growing demand for mobile broadband access, but to advance and enhance the user experience.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: receive data and first delay bound information associated with the data; generate a response to the data; schedule the transmission of the response based on the first delay bound information; and transmit the response according to the scheduling.

Another aspect of the disclosure provides a method for communication including: receiving data and first delay bound information associated with the data; generating a response to the data; scheduling the transmission of the response based on the first delay bound information; and transmitting the response according to the scheduling.

Another aspect of the disclosure provides an apparatus configured for communication. The apparatus including: means for receiving data and first delay bound information associated with the data; means for generating a response to the data; means for scheduling the transmission of the response based on the first delay bound information; and means for transmitting the response according to the scheduling.

Another aspect of the disclosure provides a non-transitory computer-readable medium storing computer-executable code, including code to: receive data and first delay bound information associated with the data; generate a response to the data; schedule the transmission of the response based on the first delay bound information; and transmit the response according to the scheduling.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The disclosure relates in some aspects to scheduling data transmissions based on an end-to-end delay bound. In some aspects, timing information is transmitted in conjunction with data over a given hop, where the timing information is based on an end-to-end delay bound for the data transmission (e.g., according to a latency requirement). For example, the timing information may indicate the time remaining for transmission of the data or the deadline for completing the data transmission. A scheduler that receives the timing information may schedule the transmission of data over another hop based on the timing information. For example, if the transmission over the first hop took a longer amount of time than expected, the scheduler may schedule the transmission over the second hop to have a shorter latency than would otherwise be employed (e.g., by prioritizing the transmission). Conversely, if the transmission over the first hop took a shorter amount of time than expected, the scheduler may schedule the transmission over the second hop to have a longer latency than would otherwise be employed (e.g., by relaxing the schedule for the transmission).

Figure 1:
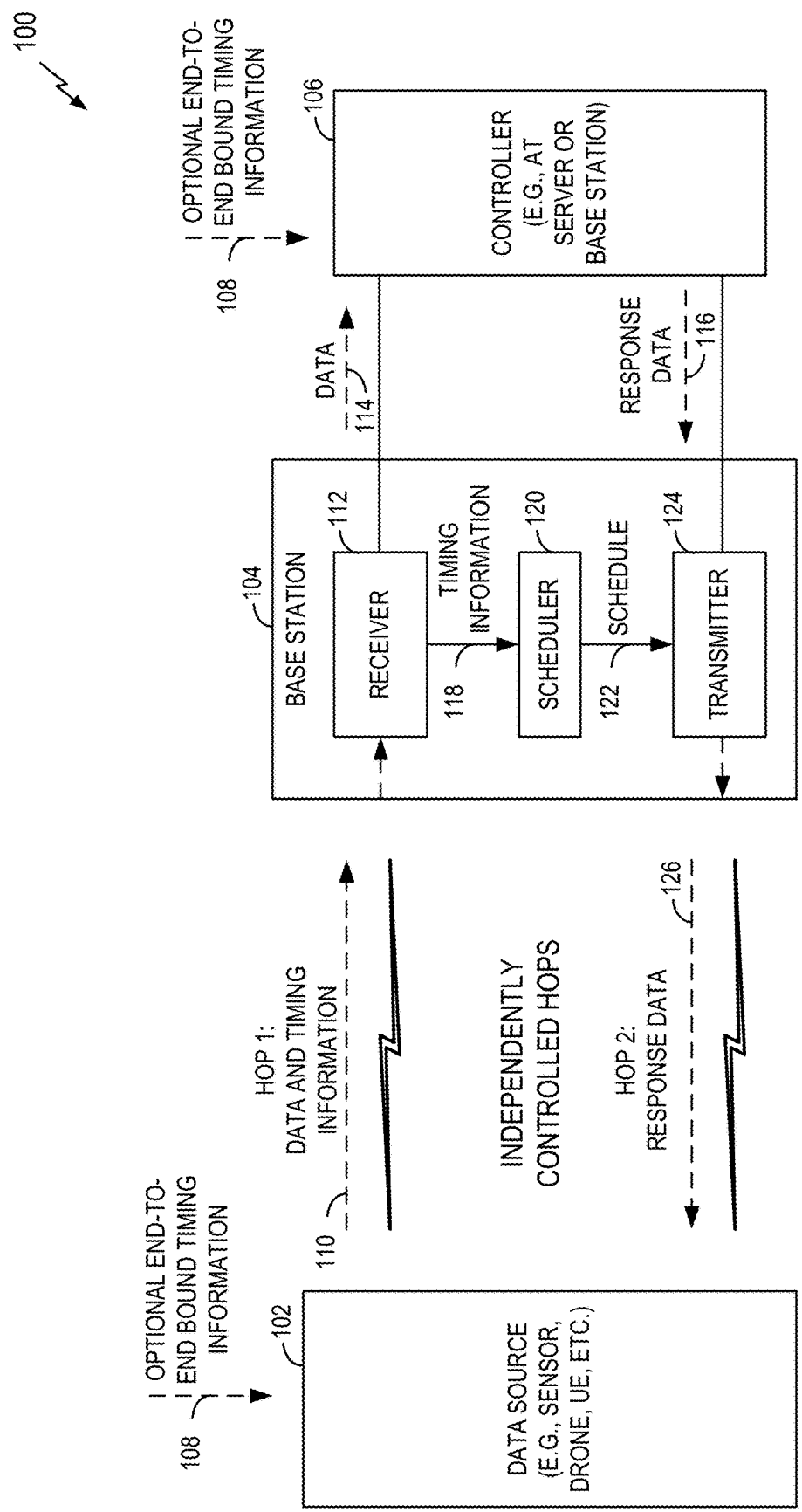
FIG. 1 is a block diagram illustrating an example of end-to-end delay bound scheduling in accordance with some aspects of the disclosure.

FIG. 1 illustrates an example of a communication system 100 that supports scheduling in accordance with the teachings herein. The communication system 100 includes a data source 102 (e.g., a sensor, a drone, a user equipment (UE), or some other wireless communication device) that communicates via a base station 104 with a controller 106. The controller 106 may reside at a server, at the base station, or at some other device in the communication system 100. Typically, the communication system 100 will include other wireless communication devices (e.g., other base stations and UEs) and other network devices (e.g., gateways, servers, etc.). To reduce the complexity of FIG. 1, however, only a single data source, base station and controller are shown.

For certain types of communication (e.g., certain applications, certain quality of service (QoS) traffic flows, etc.) the data source 102, the controller 106, or some other entity may receive timing information 108 that indicates the end-to-end delay bound for that communication. For example, a specific latency requirement may be specified for mission critical traffic. As a specific example, for a control-type application where the controller 106 generates a response to data from the data source 102, a maximum round trip delay bound may be specified for information flow from the data source 102 to the controller 106 and back to the data source 102. As a more general example, a maximum end-to-end delay bound may be specified for multi-hop data flow from a data source to a destination.

In accordance with the teachings herein, when the data source 102 needs to transmit data that is associated with an end-to-end delay bound, the data source 102 will transmit the data as well as timing information based on the end-to-end delay bound. For example, the timing information could indicate the remaining delay bound for the data (e.g., the entire end-to-end delay bound in this case), the elapsed portion of the delay bound (e.g., zero seconds in this case), the actual deadline (e.g., a time at which the round trip for the information flow must be complete), or other similar information. As discussed in more detail below, the data source 102 may send the timing information with the data or separately from the data.

Accordingly, as shown in FIG. 1, data and timing information 110 transmitted by the data source 102 flows over a first hop (hop 1) to the base station 104. A receiver 112 of the base station 104 routes the received data 114 to the controller 106. The controller 106 processes the data 114 and sends response data 116 back to the base station 104 for delivery to the data source 102 over a second hop (hop 2).

As discussed in more detail below, the first hop and the second hop may be independently controlled. For example, a scheduler (not shown) for the first hop may operate independently of a scheduler 120 for the second hop. Also, for round-trip applications, two "hops" (e.g., the first and second hops depicted in FIG. 1) may be over the same physical path but in opposite directions. In some contexts, this may be referred to as communication over a single hop.

In conjunction with the above, the receiver 112 routes the received timing information 118 to the scheduler 120 of the base station 104. The scheduler 120 determines the remaining delay bound for sending the received response data 116 over the second hop. The remaining delay bound may be computed, for example, by determining the delay over the first hop and subtracting this delay from the entire end-to-end delay bound (e.g., as received by the base station 104 via the timing information). The scheduler 120 can thus generate a schedule 122 that is used by a transmitter 124 of the base station 104 for transmission of the response data 126 to the data source 102 over the second hop based on the remaining delay bound for the response data.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 2:
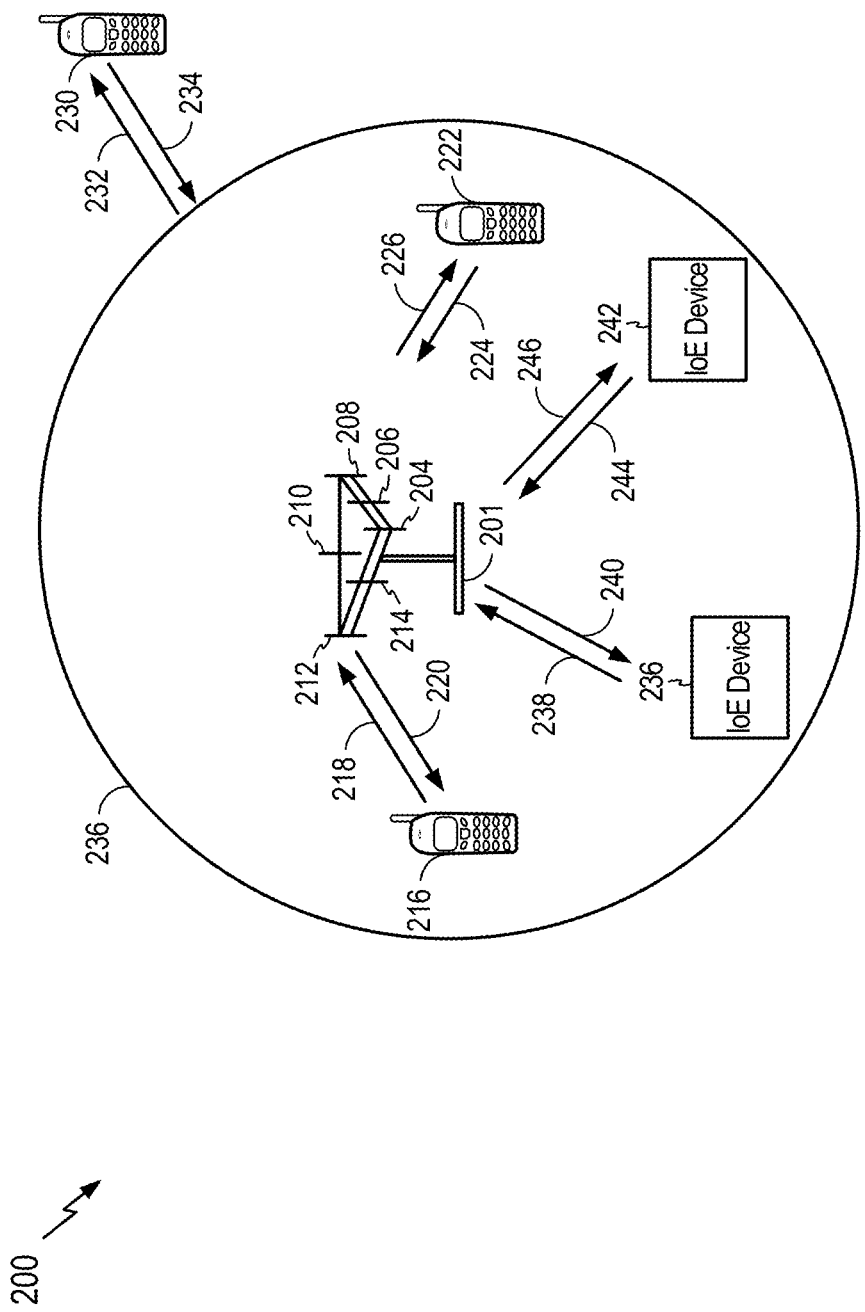
FIG. 2 is a diagram illustrating an example of a multiple access wireless communication system within which aspects of the disclosure may find application.

FIG. 2 illustrates an example communication network 200 in which aspects of the present disclosure may be performed. For example, techniques presented herein may be used to share a common set of resources between various devices having different priority levels.

In the example of FIG. 2, a base station (BS) 201 may include multiple antenna groups, one group including antennas 204 and 206, another group including antennas 208 and 210, and an additional group including antennas 212 and 214. In FIG. 2, two antennas are shown for each antenna group, however, more or fewer antennas may be utilized for each antenna group. A wireless communication node 216 may be in communication with the antennas 212 and 214, where the antennas 212 and 214 transmit information to the wireless node 216 over a forward link 220 and receive information from the wireless communication node 216 over a reverse link 218. A wireless communication node 222 may be in communication with the antennas 204 and 206, where the antennas 204 and 206 transmit information to the wireless communication node 222 over a forward link 226 and receive information from the wireless communication node 222 over a reverse link 224. The BS 201 may also be in communication with other wireless communication nodes, which may be, for example, Internet-of-Everything (IoE) devices. An IoE device 236 may be in communication with one or more other antennas of the BS 201, where the antennas transmit information to the IoE device 236 over a forward link 240 and receive information from the IoE device 236 over a reverse link 238. An IoE device 242 may be in communication with one or more other antennas of the BS 201, where the antennas transmit information to the IoE device 242 over a forward link 246 and receive information from the IoE device 242 over a reverse link 244. In a Frequency Division Duplex (FDD) system, the communication links 218, 220, 224, 226, 238, 240, 244, and 246 may use different frequency for communication. For example, the forward link 220 may use a different frequency than that used by the reverse link 218, and forward link 240 may use a different frequency than that used by reverse link 238.

The various concepts presented throughout this disclosure may be implemented across a broad variety of telecommunication systems, network architectures, and communication standards. For example, the Third Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc.

Mission Critical Scheduling

Additional details of end-to-end based scheduling in accordance with the teachings herein will now be described in a context of mission-critical traffic. It should be appreciated that the teachings herein are not limited to mission-critical applications, however.

Some applications (e.g., mission critical applications) simultaneously require very high packet reliability as well as very low latency. Common examples of such applications are control applications that may arise in robotics, factory automation, server controlled drones, and so on. Such applications may have stringent requirements on the round-trip latency for the round-trip between the sensing packet sent to the controller and the control response packet sent back from the controller. For example, the control response packet may indicate a control action that may need to be implemented in a timely manner and a large delay in the feedback loop may impact the effectiveness of the control application by affecting the stability of the feedback loop.

Traditionally, communication links may be designed to guarantee a one-way delay bound (e.g., independently in the uplink and downlink directions). Suppose an application has a round-trip delay bound requirement of T milliseconds, then this requirement can be achieved by ensuring a T/2 millisecond one-way delay bound in each of the uplink direction and the downlink direction. However, this is only a sufficient condition—if the transmission in one direction, say the downlink, takes more than T/2 milliseconds, then it might still be possible to achieve the T millisecond round-trip delay bound by accounting for the additional delay in the uplink transmission deadline. Similarly, if the downlink transmission takes less than T/2 milliseconds, then the time budget for the uplink may be relaxed beyond T/2 as long as the round-trip deadline is met.

Traditionally, a scheduler may discard packets that have expired (e.g., a latency deadline has passed) to avoid wastage of resources. A scheme designed to guarantee a one-way delay bound of T/2 in each direction may thus be suboptimal, since such a scheme may discard packets that are late in the downlink direction without considering the opportunity to compensate in the uplink (or vice versa). In general, this problem may arise if the application requirement is in terms of an end-to-end delay bound but each hop operates independently. For example, the schedulers for the different hops may operate independently (e.g., the schedulers may be controlled independently).

To avoid this problem, in accordance with the teachings herein, the scheduler in the uplink direction may be made aware of the portion of the round-trip delay bound that remains after the downlink transmission (or vice versa if uplink is the first hop).

The disclosure relates in some aspects to conveying along with each packet, the remaining delay bound of that packet for the packet to reach its final destination. Alternately and equivalently, the elapsed portion of the end-to-end delay or the absolute deadline (e.g., an end-to-end delay bound deadline) could be conveyed.

Any of this delay bound-related information could be sent in the form of a field embedded inside the packet or in the form of a separate control message. As an example of the latter case, a control application may convey the round-trip delay bound to a link-level scheduler through an application programming interface.

A data source will initialize the delay bound information depending on the type of information being conveyed. If the information is a remaining delay bound, the data source may initialize the information to the end-to-end delay bound required by the application (e.g., round trip time). If the information is an elapsed delay bound, the data source may initialize the information to zero since data transmission has not yet commenced. If the information is an absolute deadline, the data source may initialize the information to indicate the deadline (e.g., a specific time).

After each hop traversed by the packet, the delay bound information is modified (e.g., by a scheduler at the end of the hop) to account for the hop delay, if applicable. If the information is a remaining delay bound, the remaining delay bound is decreased by the total delay incurred on the latest hop. If the information is an elapsed delay bound, the elapsed delay bound is increased by the total delay incurred on the latest hop. If the information is an absolute deadline, the information is not changed.

In the case of a control application, the delay bound for the controller's response packet may also take into account any processing delays incurred within the controller. For example, the processing delay may be subtracted from the remaining delay bound of an incoming sensing packet. As another example, the processing delay may be added to the elapsed delay bound of an incoming sensing packet.

The delay bound information (e.g., remaining delay, elapsed delay, etc.) for each packet may be used by a scheduler of each link to compute a deadline for each packet's reception on that link. The deadline information can be a valuable input to the scheduling algorithm, for example, to implement an earliest-deadline-first scheduler. With knowledge of the current delay bound status (e.g., the remaining delay bound, the elapsed delay bound, etc.) the scheduler of each hop can relax the deadline for those packets that gained time in previous hops. Similarly, the scheduler of a hop may prioritize packets which lost time in previous hops. Such an approach may therefore improve the end-to-end throughput of the system subject to the delay bound. At the point when a packet is eventually transmitted, the delay bound information may be further modified to account for the queuing delay incurred while the packet waited to be scheduled for transmission. For example, the queuing delay may be subtracted from the remaining delay bound. As another example, the queuing delay may be added to the elapsed delay bound. The updated delay bound information may be transmitted along with the data for use in the scheduler for (e.g., inside) the next hop node.

Additional Scheduling Details

Figure 3:
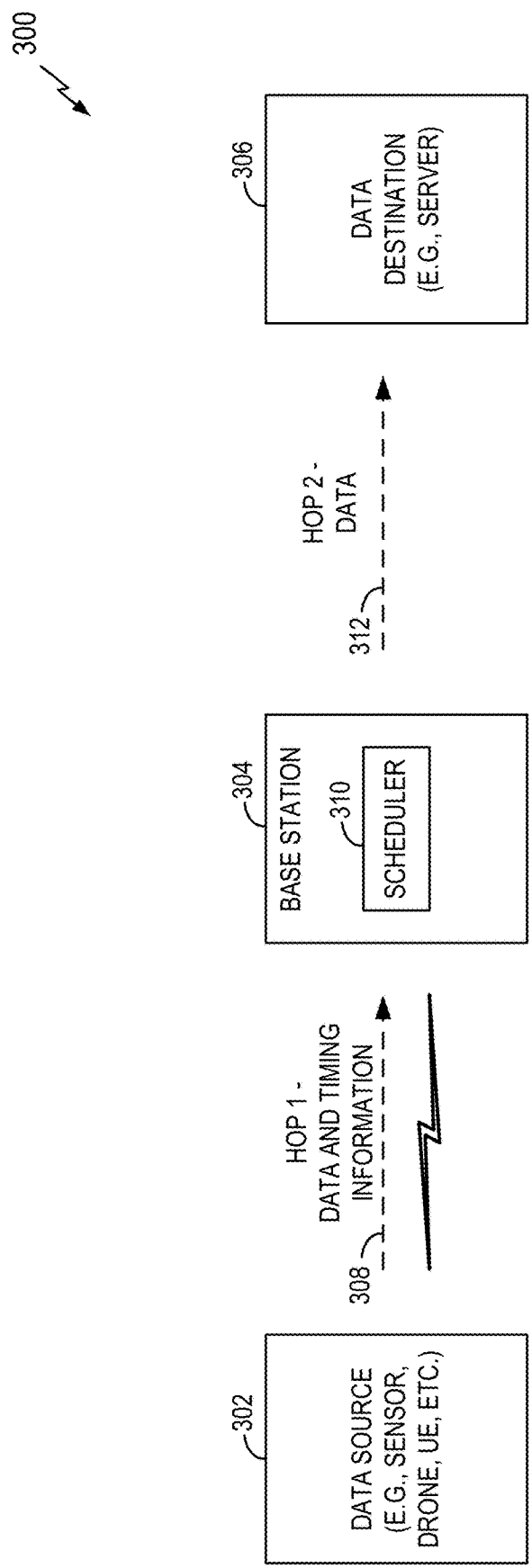
FIG. 3 is a block diagram illustrating an example of multi-hop delay bound scheduling in accordance with some aspects of the disclosure.
Figure 4:
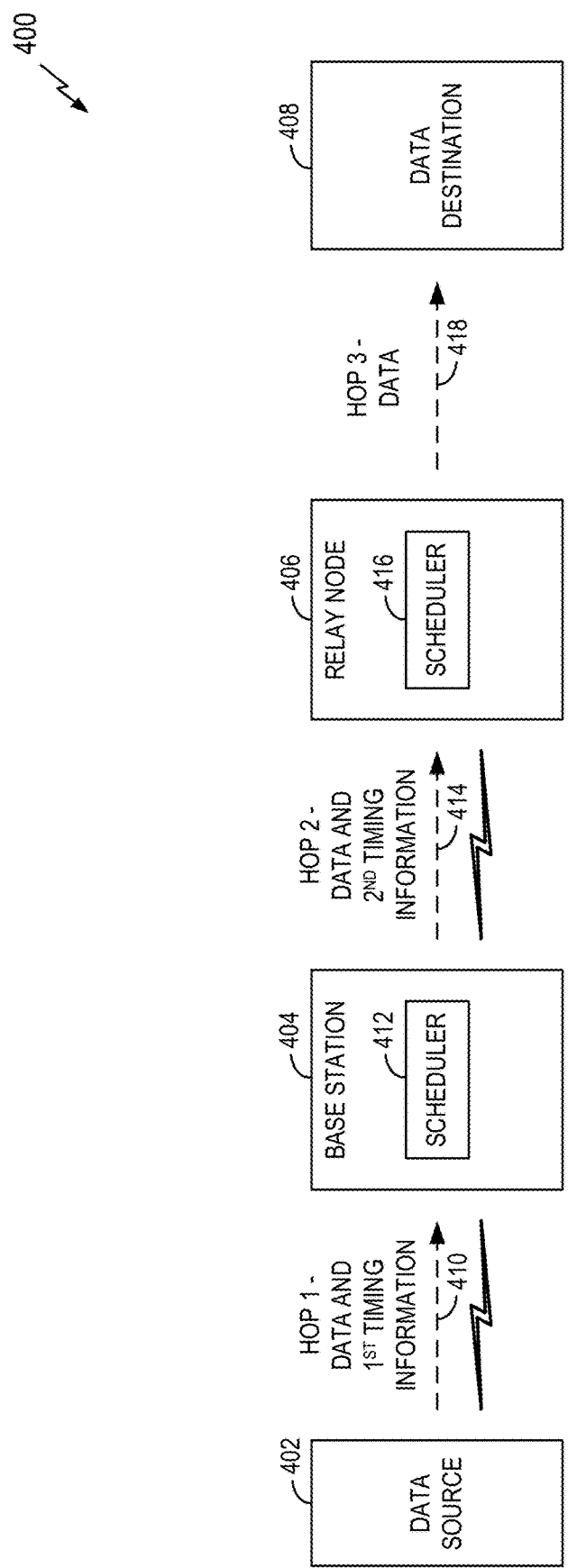
FIG. 4 is a block diagram illustrating another example of multi-hop delay bound scheduling in accordance with some aspects of the disclosure.
Figure 5:
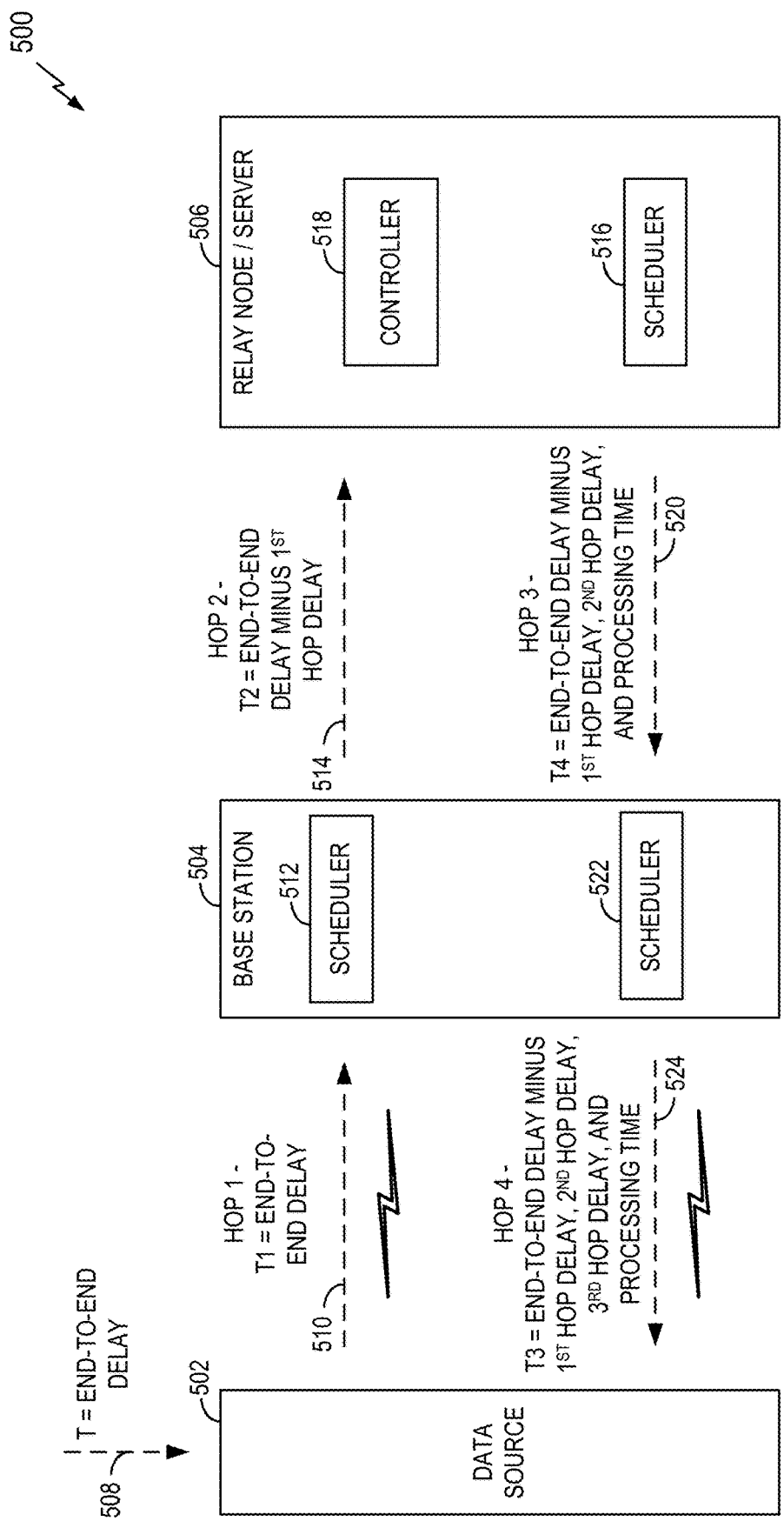
FIG. 5 is a block diagram illustrating an example of round-trip delay bound scheduling in accordance with some aspects of the disclosure.

Additional details of scheduling in accordance with the teachings herein will now be described with reference to FIGS. 3-11. FIGS. 3-5 depict different multi-hop scenarios.

For example, FIG. 3 illustrates that the teachings herein are applicable to multi-hop applications, in general, not just round-trip applications. The communication system 300 of FIG. 3 includes a data source 302, a base station 304, and a data destination 306.

The data source 302 sends data and associated timing information 308 (e.g., remaining delay bound, elapsed delay bound, etc.) to the base station 304 via a first hop (hop 1). As discussed herein, the timing information could indicate the remaining delay bound for the data (e.g., the entire end-to-end delay bound), the elapsed portion of the delay bound (e.g., the amount of time the data has been in transit), the actual deadline (e.g., a time at which the end-to-end transit for the data must be complete), the time of transmission of the data, or other similar information.

A scheduler 310 in the base station 304 may then calculate the current remaining delay bound, the current elapsed delay bound, or other similar timing information based on the timing information received from the data source 302 and based on the first hop delay. The scheduler 310 may thus schedule the transmission of the corresponding data 312 from the base station 304 to the data destination 306 over a second hop (hop 2) accordingly.

FIG. 4 illustrates that the teachings herein are applicable to any number of hops, not just two hops. For example, a data path may have one, two, or more relay nodes for relaying data over two, three, or more hops.

The communication system 400 of FIG. 4 includes a data source 402, a base station 404, a relay node 406, and a data destination 408. The data source 402 sends data and associated first timing information 410 (e.g., remaining delay bound, elapsed delay bound, etc.) to the base station 404 via a first hop (hop 1). A scheduler 412 of the base station 404 may thus calculate the current remaining delay bound, the current elapsed delay bound, or other similar timing information based on the timing information received from the data source 402 and based on the first hop delay. The scheduler 412 may then schedule the transmission of the data from the base station 404 to the relay node 406 over a second hop (hop 2) accordingly.

The base station 404 transmits the data as well as associated second timing information 414 that is based on the end-to-end delay bound. For example, the timing information could indicate the remaining delay bound for the data (e.g., the end-to-end delay bound minus the first hop delay), the elapsed portion of the delay bound (e.g., the amount of time the data has been in transit), the actual deadline (e.g., a time at which the end-to-end transit for the data must be complete), or other similar information.

A scheduler 416 in the relay node 406 may calculate the current remaining delay bound, the current elapsed delay bound, or other similar timing information based on the timing information received from the base station 404 and based on the second hop delay. The scheduler 416 may then schedule the transmission of the data 418 from the relay node 406 to the data destination 408 over a third hop (hop 3) accordingly.

FIG. 5 illustrates an example of how delay bound information may change as data traverses several nodes in a multi-hop environment. The communication system 500 of FIG. 5 includes a data source 502, a base station 504, and a relay node/server 506. For purposes of explanation, this example discusses the use of a remaining delay bound. It should be appreciated, however, that the teachings herein are applicable to other types of timing information.

Initially, the data source 502 receives 508 an indication T of the maximum end-to-end delay for a given type of data traffic (e.g., mission critical traffic). Thus, for a first hop (hop 1), the timing information T1 sent 510 by the data source indicates this end-to-end delay value.

A first scheduler 512 in the base station 504 determines the current remaining delay bound by subtracting the first hop transit delay from the end-to-end delay and schedules a transmission to the relay node/server accordingly. For a second hop (hop 2), the timing information T2 sent 514 by the base station 504 indicates a new (smaller) value. Specifically, the timing information T2 is equal to the maximum end-to-end delay minus the total first hop delay. The total first hop delay may be computed as the amount of time that elapsed between the time at which a packet was transmitted over the first hop and the time at which the packet was transmitted over the second hop. The total first hop delay also could include the time taken for transit over the first hop and any queuing delay within the base station 504 (or other applicable node) before the scheduling of the packet transmission over the second hop. Thus, the scheduler 512 may compute a delay bound by subtracting the first-hop transit delay from the end-to-end delay bound, and use this for scheduling. Moreover, when the packet is actually transmitted, the remaining delay bound to be conveyed along with the packet may be computed by further subtracting the queuing delay incurred due to the scheduling itself.

A scheduler 516 in the relay node/server 506 determines the current remaining delay bound by subtracting the second hop delay and any data processing time (e.g., delay due to a controller 518 processing the received data to generate response data to be sent to the data source 502) from the received timing information T2 and schedules a transmission of the response data to the base station 504 accordingly. Thus, for a third hop (hop 3), the timing information T3 sent 520 to the base station 504 indicates this new (even smaller) value. Specifically, the timing information T3 is equal to the maximum end-to-end delay minus the first hop delay, minus the second hop delay, and minus the processing time.

A second scheduler 522 in the base station 504 determines the current remaining delay bound by subtracting the third hop delay from the timing information T3 received from the relay node/server 506 and schedules a transmission of the response data to the data source 502 accordingly. Thus, for a fourth hop (hop 4), the timing information T4 (which typically would not be sent by the base station 504 since this is the last hop) indicates this new (even smaller) value. Specifically, the timing information T4 is equal to the maximum end-to-end delay minus the first hop delay, minus the second hop delay, minus the processing time, and minus the third hop delay.

Figure 6:
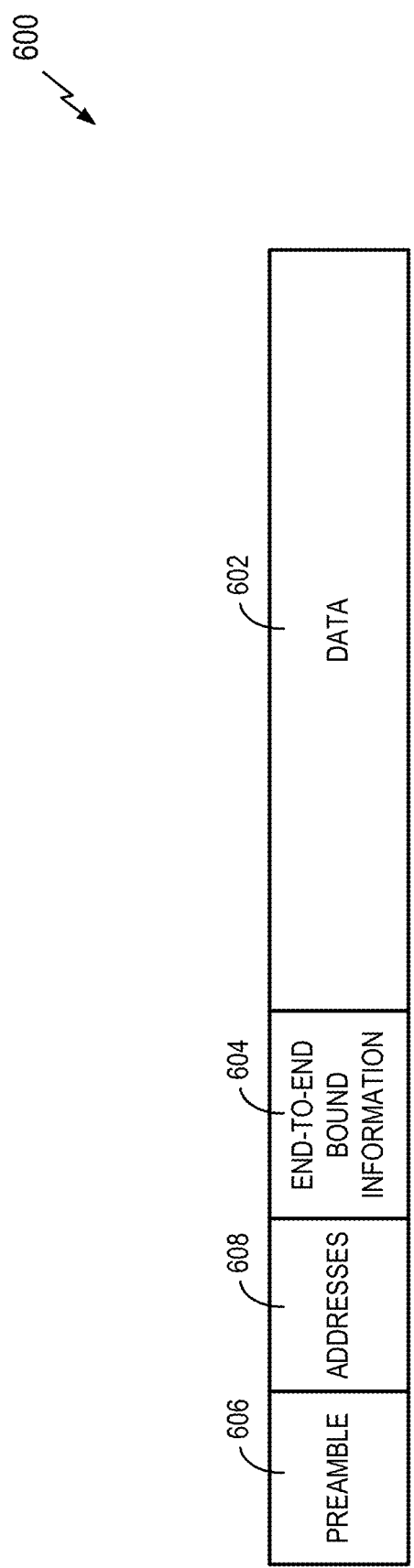
FIG. 6 is a diagram illustrating an example of a packet structure in accordance with some aspects of the disclosure.
Figure 7:
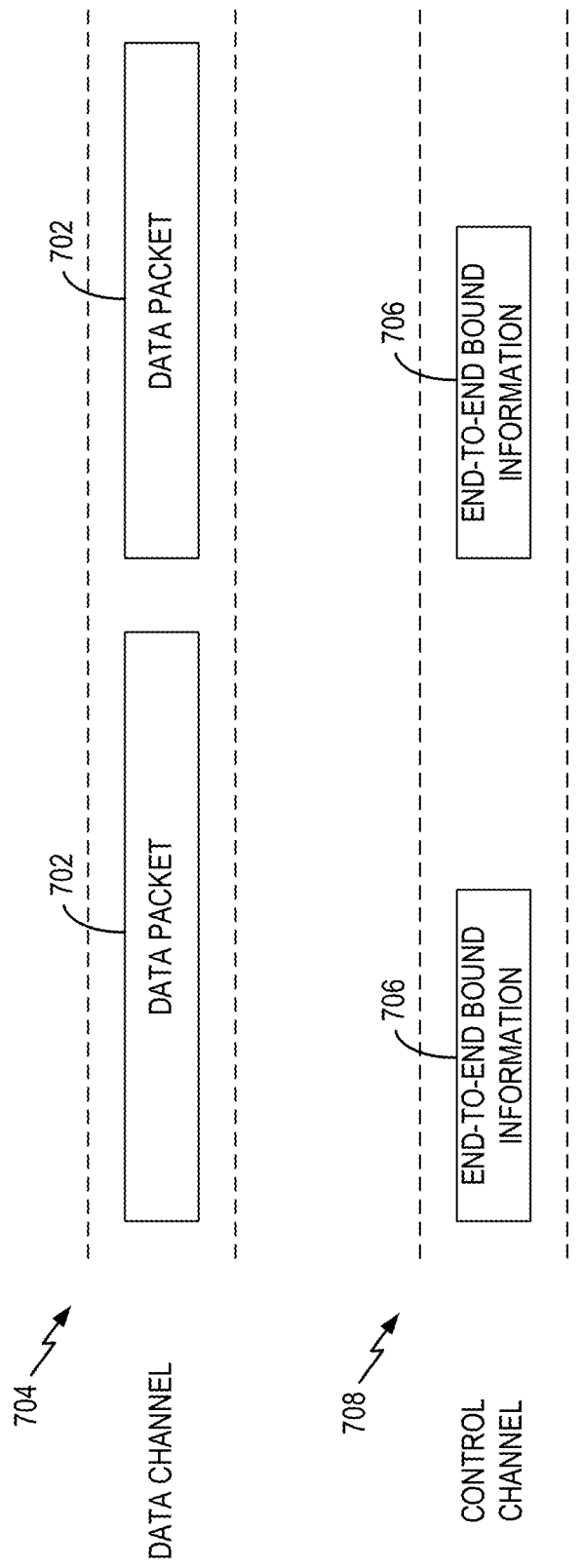
FIG. 7 is a diagram illustrating an example of communication channels in accordance with some aspects of the disclosure.
Figure 8:
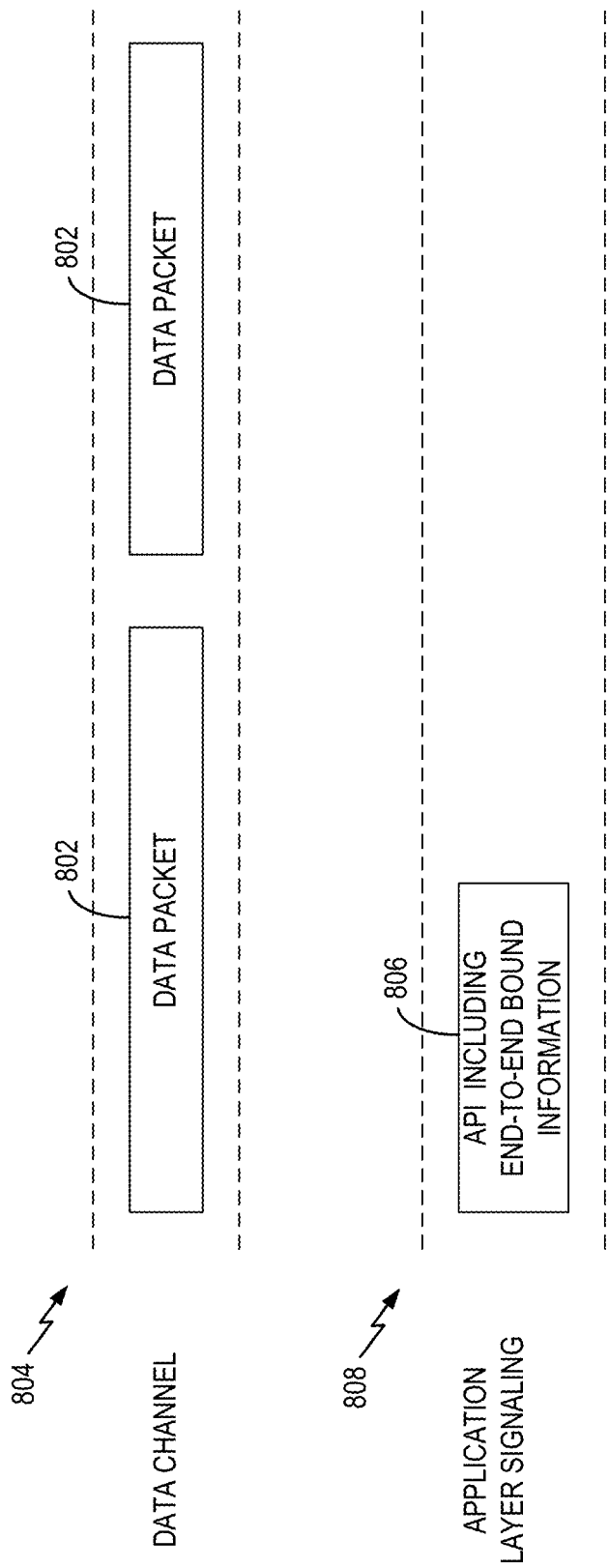
FIG. 8 is a diagram illustrating an example of application program interface (API) communication in accordance with some aspects of the disclosure.

FIGS. 6-8 illustrate different ways of sending timing information. FIG. 6 illustrates an example where a packet 600 may include both data 602 and end-to-end bound information 604 or other appropriate timing information, in addition to standard packet fields such as a preamble 606 and addresses 608.

FIG. 7 illustrates an example where data packets 702 are carried by a data channel 704 and timing information (e.g., end-to-end bound information 706) is carried by a control channel 708. The example of FIG. 7 may be used for example, to send information via lower layer (e.g., layer 2) signaling between base stations, relay nodes, and the like.

FIG. 8 illustrates an example where data packets 802 are carried by a data channel 804 and timing information (e.g., end-to-end bound information 806) is sent via application layer signaling 808 (e.g., an application program interface, API). The example of FIG. 8 may be used, for example, to send information from an application running on a data source to a base station.

Figure 9:
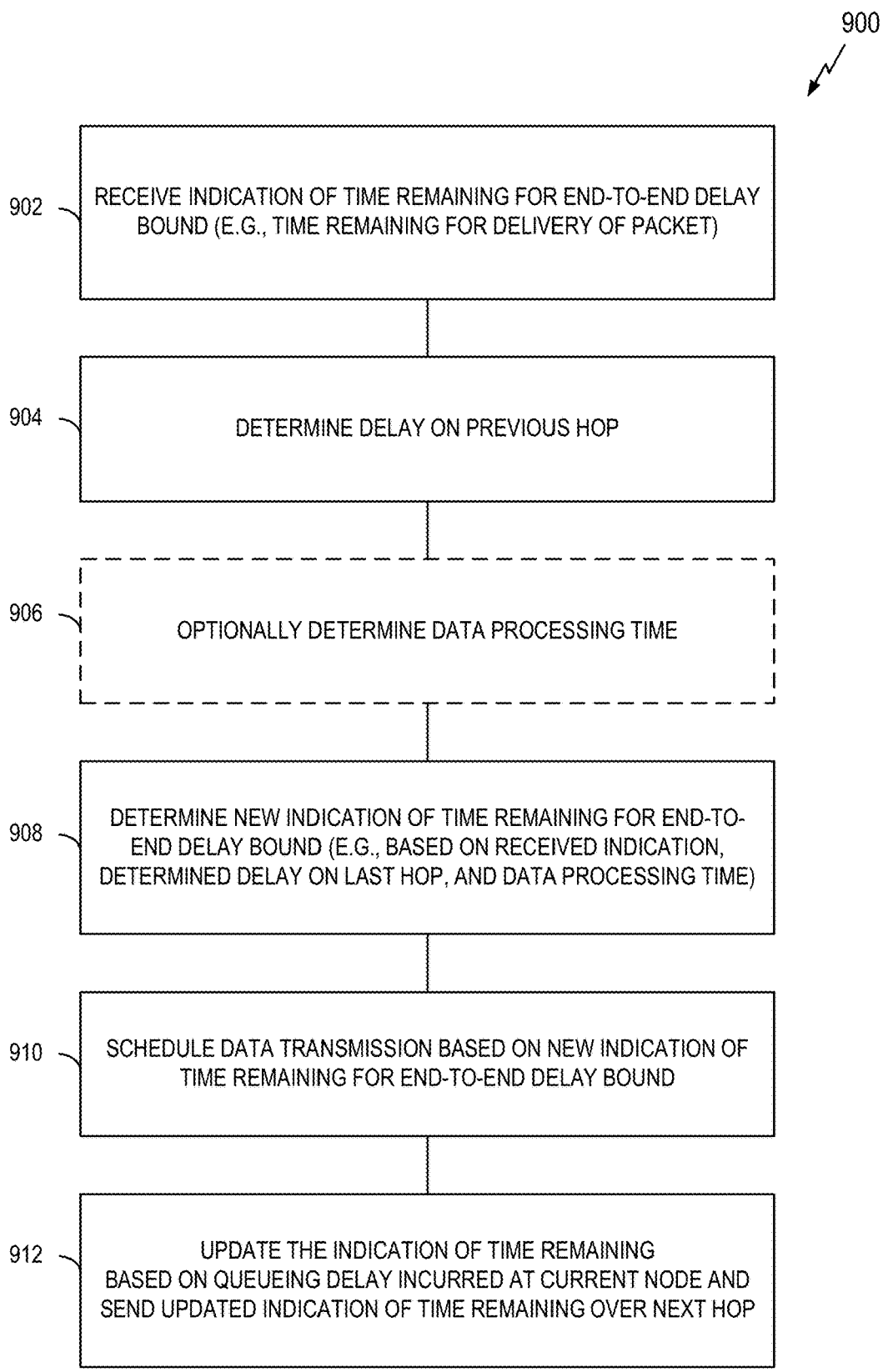
FIG. 9 is a flow diagram illustrating an example of a scheduling process based on remaining time in accordance with some aspects of the disclosure.
Figure 10:
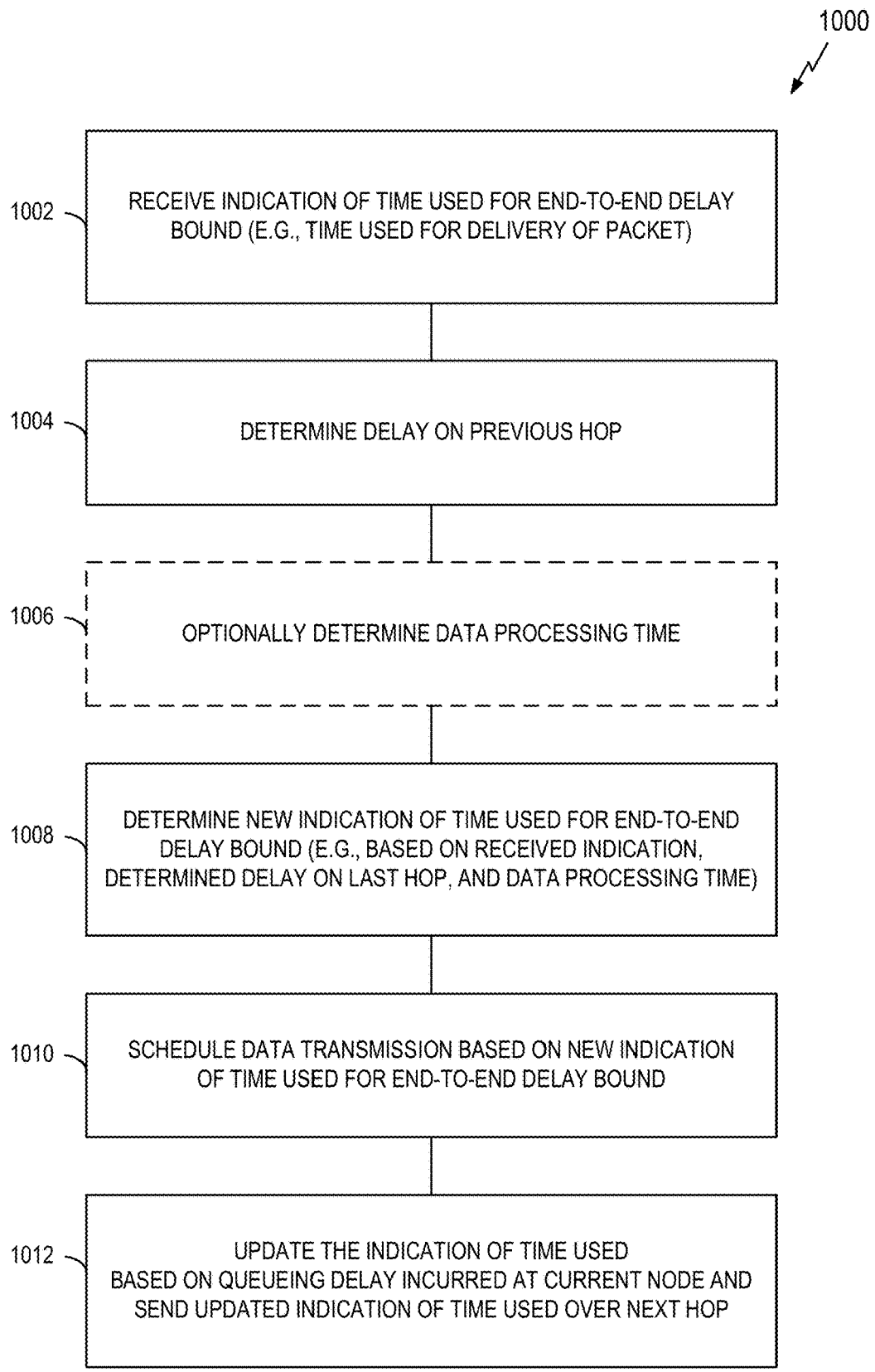
FIG. 10 is a flow diagram illustrating an example of a scheduling process based on elapsed time in accordance with some aspects of the disclosure.
Figure 11:
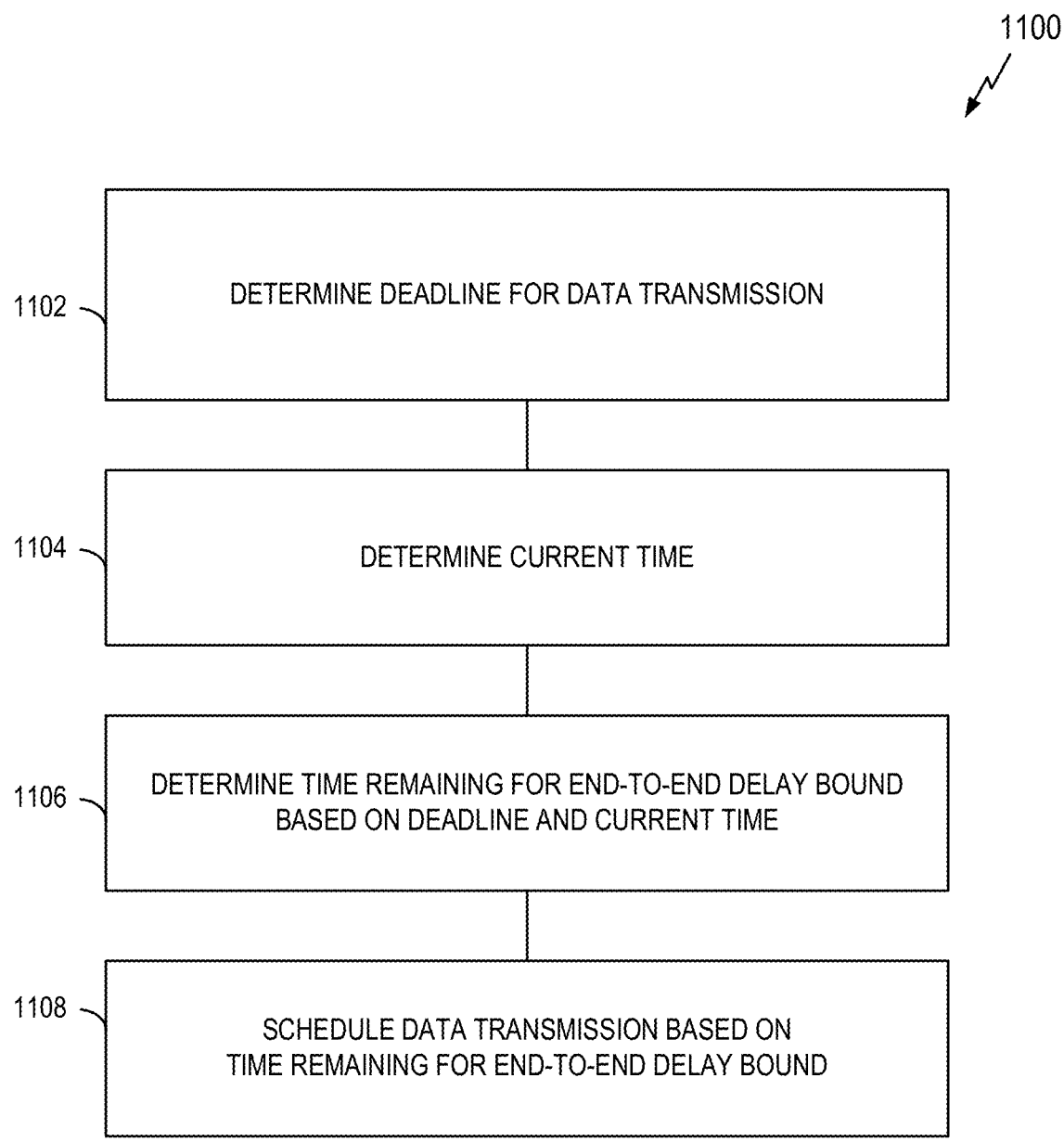
FIG. 11 is a flow diagram illustrating an example of a scheduling process based on a deadline in accordance with some aspects of the disclosure.

FIGS. 9-11 illustrate several examples of how a scheduler may use different types of timing information. FIG. 9 describes an example where the timing information indicates the time remaining. FIG. 10 describes an example where the timing information indicates the time elapsed. FIG. 11 describes an example where the timing information indicates a deadline. For purposes of explanation, the following may refer to data as traversing one hop and then another hop. It should be appreciated that this description is equally applicable to round-trip applications (e.g., where data and a corresponding response are sent over a common hop, albeit in different directions).

FIG. 9 illustrates a scheduling process 900 in accordance with some aspects of the disclosure. The process 900 may take place within a processing circuit (e.g., the processor 1510 of FIG. 15), which may be located in a base station, an access terminal, or some other suitable apparatus. In some aspects, the process 900 may be performed by a scheduling entity (e.g., a scheduler). Of course, in various aspects within the scope of the disclosure, the process 900 may be implemented by any suitable apparatus capable of supporting scheduling-related operations.

At block 902, an apparatus (e.g., a scheduler) receives an indication of time remaining for end-to-end delay bound (e.g., time remaining for delivery of a packet).

At block 904, the apparatus determines the delay on the previous hop that the data traversed.

At optional block 906, the apparatus determines a data processing time, if applicable.

At block 908, the apparatus determines a new indication of time remaining for end-to-end delay bound (e.g., based on the indication received at block 902, the delay at block 904, and the data processing time determined at block 906, if applicable). For example, the new indication of time remaining may be obtained by subtracting the previous hop delay determined in block 904 and the data processing time determined in block 906, if applicable, from the original time remaining indication from block 902.

At block 910, the apparatus schedules a data transmission based on the new indication of time remaining for end-to-end delay bound determined at block 908.

At block 912, the apparatus updates the indication of time remaining for end-to-end delay bound to account for queueing delay, if applicable. For example, the apparatus may update (e.g., decrease) the time remaining based on queueing delay incurred at the current hop (e.g., at the apparatus). The apparatus then sends the updated indication of time remaining over the next hop.

FIG. 10 illustrates a scheduling process 1000 in accordance with some aspects of the disclosure. The process 1000 may take place within a processing circuit (e.g., the processor 1510 of FIG. 15), which may be located in a base station, an access terminal, or some other suitable apparatus. In some aspects, the process 1000 may be performed by a scheduling entity (e.g., a scheduler). Of course, in various aspects within the scope of the disclosure, the process 1000 may be implemented by any suitable apparatus capable of supporting scheduling-related operations.

At block 1002, an apparatus (e.g., a scheduler) receives an indication of time used (e.g., elapsed) for end-to-end delay bound (e.g., time used for delivery of a packet).

At block 1004, the apparatus determines the delay on the previous hop that the data traversed.

At optional block 1006, the apparatus determines a data processing time, if applicable.

At block 1008, the apparatus determines a new indication of time used for end-to-end delay bound (e.g., based on the indication received at block 1002, the delay at block 1004, and the data processing time determined at block 1006, if applicable). For example, the new indication of time used may be obtained by adding the previous hop delay determined in block 1004 and the data processing time determined in block 1006, if applicable, to the original time used indication from block 1002.

At block 1010, the apparatus schedules a data transmission based on the new indication of time used for end-to-end delay bound determined at block 1008.

At block 1012, the apparatus updates the indication of time used for end-to-end delay bound to account for queueing delay, if applicable. For example, the apparatus may update (e.g., increase) the time used based on queueing delay incurred at the current hop (e.g., at the apparatus). The apparatus then sends the updated indication of time used over the next hop.

FIG. 11 illustrates a scheduling process 1100 in accordance with some aspects of the disclosure. The process 1100 may take place within a processing circuit (e.g., the processor 1510 of FIG. 15), which may be located in a base station, an access terminal, or some other suitable apparatus. In some aspects, the process 1100 may be performed by a scheduling entity (e.g., a scheduler). Of course, in various aspects within the scope of the disclosure, the process 1100 may be implemented by any suitable apparatus capable of supporting scheduling-related operations.

At block 1102, an apparatus (e.g., a scheduler) determines (e.g., receives) a deadline for data transmission.

At block 1104, the apparatus determines the current time.

At block 1106, the apparatus determines the time remaining for end-to-end delay bound based on the deadline and the current time (e.g., by subtracting the current time from the deadline).

At block 1108, the apparatus schedules a data transmission based on the time remaining for end-to-end delay bound determined at block 1106.

Example Apparatus

Figure 12:
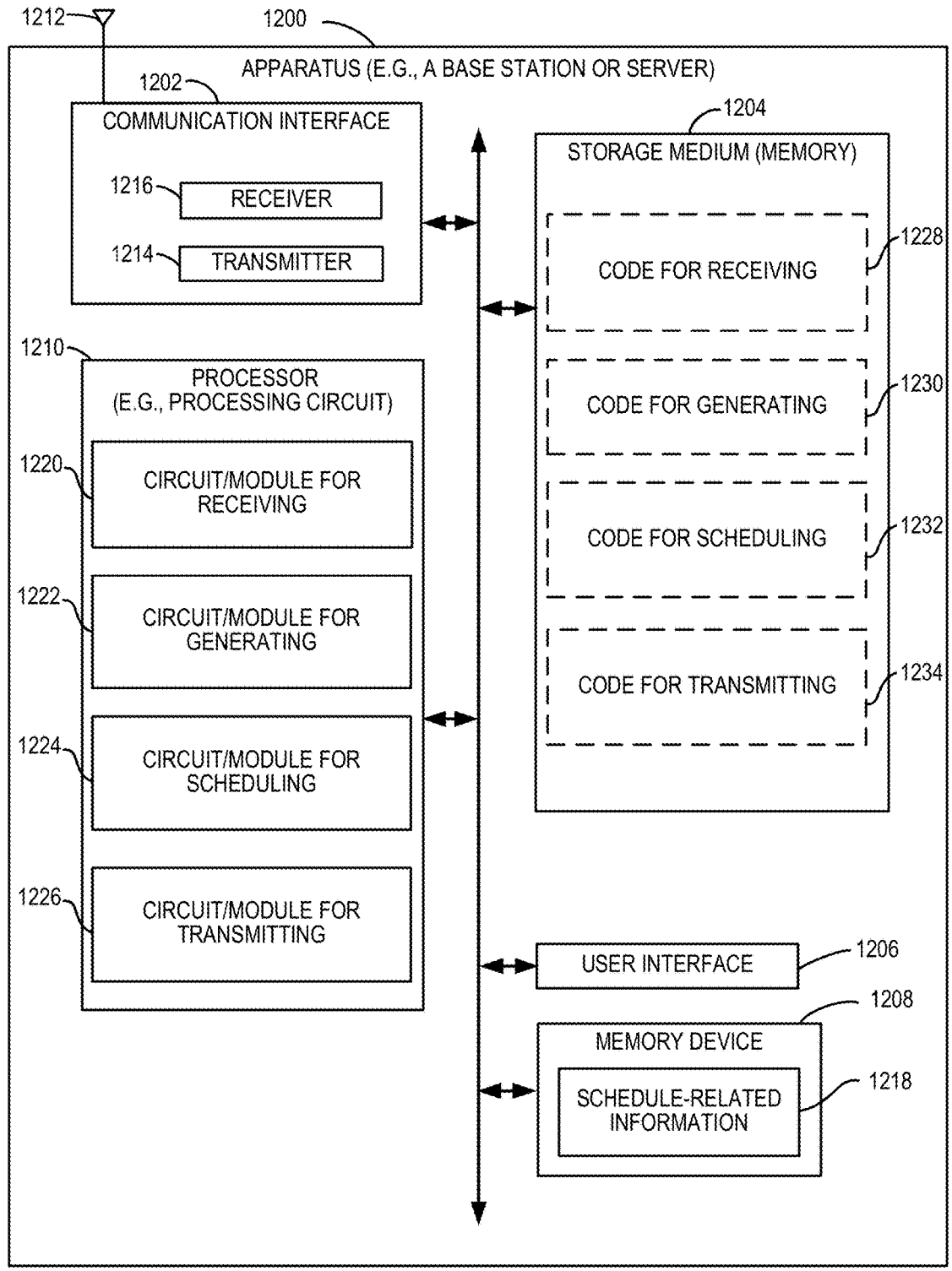
FIG. 12 is a block diagram of an example hardware implementation for an apparatus (e.g., an electronic device) that can support scheduling in accordance with some aspects of the disclosure.

FIG. 12 is an illustration of an apparatus 1200 that may support scheduling according to one or more aspects of the disclosure. In some aspects, the apparatus could embody or be implemented within a base station, a server, a controller, or a scheduler (e.g., the base station 104 or the controller 106 of FIG. 1, the base station 304 of FIG. 3, the base station 404 or the relay node 406 of FIG. 4, or the base station 504 or the relay node/server 506 of FIG. 5). In various implementations, the apparatus 1200 could embody or be implemented within an access point, an access terminal, a mobile device, or some other type of device that supports wireless communication. In various implementations, the apparatus 1200 could embody or be implemented within a sensor, a manufacturing device, a drone, or some other type of communication device. In various implementations, the apparatus 1200 could embody or be implemented within a mobile phone, a smart phone, a tablet, a portable computer, a server, a personal computer, a sensor, an entertainment device, a medical device, or any other electronic device having circuitry.

The apparatus 1200 includes a communication interface 1202 (e.g., at least one transceiver), a storage medium 1204, a user interface 1206, a memory device 1208, and a processor 1210 (e.g., a processing circuit). These components can be coupled to and/or placed in electrical communication with one another via a signaling bus or other suitable component, represented generally by the connection lines in FIG. 12. The signaling bus may include any number of interconnecting buses and bridges depending on the specific application of the processor 1210 and the overall design constraints. The signaling bus links together various circuits such that each of the communication interface 1202, the storage medium 1204, the user interface 1206, and the memory device 1208 are coupled to and/or in electrical communication with the processor 1210. The signaling bus may also link various other circuits (not shown) such as timing sources, peripherals, voltage regulators, and power management circuits, which are well known in the art, and therefore, will not be described any further.

The communication interface 1202 may be adapted to facilitate wireless communication of the apparatus 1200. For example, the communication interface 1202 may include circuitry and/or programming adapted to facilitate the communication of information bi-directionally with respect to one or more communication devices in a network. In some implementations, the communication interface 1202 may be configured for wire-based communication. In some implementations, the communication interface 1202 may be coupled to one or more antennas 1212 for wireless communication within a wireless communication system. The communication interface 1202 can be configured with one or more standalone receivers and/or transmitters, as well as one or more transceivers. In the illustrated example, the communication interface 1202 includes a transmitter 1214 and a receiver 1216.

The memory device 1208 may represent one or more memory devices. As indicated, the memory device 1208 may maintain schedule-related information 1218 along with other information used by the apparatus 1200. In some implementations, the memory device 1208 and the storage medium 1204 are implemented as a common memory component. The memory device 1208 may also be used for storing data that is manipulated by the processor 1210 or some other component of the apparatus 1200.

The storage medium 1204 may represent one or more computer-readable, machine-readable, and/or processor-readable devices for storing programming, such as processor executable code or instructions (e.g., software, firmware), electronic data, databases, or other digital information. The storage medium 1204 may also be used for storing data that is manipulated by the processor 1210 when executing programming. The storage medium 1204 may be any available media that can be accessed by a general purpose or special purpose processor, including portable or fixed storage devices, optical storage devices, and various other mediums capable of storing, containing or carrying programming.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1204 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium.

The storage medium 1204 may be coupled to the processor 1210 such that the processor 1210 can read information from, and write information to, the storage medium 1204. That is, the storage medium 1204 can be coupled to the processor 1210 so that the storage medium 1204 is at least accessible by the processor 1210, including examples where at least one storage medium is integral to the processor 1210 and/or examples where at least one storage medium is separate from the processor 1210 (e.g., resident in the apparatus 1200, external to the apparatus 1200, distributed across multiple entities, etc.).

Programming stored by the storage medium 1204, when executed by the processor 1210, causes the processor 1210 to perform one or more of the various functions and/or process operations described herein. For example, the storage medium 1204 may include operations configured for regulating operations at one or more hardware blocks of the processor 1210, as well as to utilize the communication interface 1202 for wireless communication utilizing their respective communication protocols.

The processor 1210 is generally adapted for processing, including the execution of such programming stored on the storage medium 1204. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processor 1210 is arranged to obtain, process and/or send data, control data access and storage, issue commands, and control other desired operations. The processor 1210 may include circuitry configured to implement desired programming provided by appropriate media in at least one example. For example, the processor 1210 may be implemented as one or more processors, one or more controllers, and/or other structure configured to execute executable programming Examples of the processor 1210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processor 1210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processor 1210 are for illustration and other suitable configurations within the scope of the disclosure are also contemplated.

According to one or more aspects of the disclosure, the processor 1210 may be adapted to perform any or all of the features, processes, functions, operations and/or routines for any or all of the apparatuses described herein. For example, the processor 1210 may be configured to perform any of the steps, functions, and/or processes described with respect to FIGS. 1-11, 13, and 14. As used herein, the term "adapted" in relation to the processor 1210 may refer to the processor 1210 being one or more of configured, employed, implemented, and/or programmed to perform a particular process, function, operation and/or routine according to various features described herein.

The processor 1210 may be a specialized processor, such as an application specific integrated circuit (ASIC) that serves as a means for (e.g., structure for) carrying out any one of the operations described in conjunction with FIGS. 1-11, 13, and 14. The processor 1210 may serve as one example of a means for transmitting and/or a means for receiving. In various implementations, the processor 1210 may incorporate the functionality of the base station 104 (e.g., the scheduler 120) or the controller 106 of FIG. 1, the base station 304 (e.g., the scheduler 310) of FIG. 3, the base station 404 (e.g., the scheduler 412) or the relay node 406 (e.g., the scheduler 416) of FIG. 4, or the base station 504 (e.g., the scheduler 512 and/or the scheduler 522) or the relay node/server 506 (e.g., the scheduler 516 and/or the controller 518) of FIG. 5.

According to at least one example of the apparatus 1200, the processor 1210 may include one or more of a circuit/module for receiving 1220, a circuit/module for generating 1222, a circuit/module for scheduling 1224, or a circuit/module for transmitting 1226. In various implementations, the circuit/module for receiving 1220, the circuit/module for generating 1222, the circuit/module for scheduling 1224, or the circuit/module for transmitting 1226 may correspond, at least in part, to the base station 104 (e.g., the scheduler 120) or the controller 106 of FIG. 1, the base station 304 (e.g., the scheduler 310) of FIG. 3, the base station 404 (e.g., the scheduler 412) or the relay node 406 (e.g., the scheduler 416) of FIG. 4, or the base station 504 (e.g., the scheduler 512 and/or the scheduler 522) or the relay node/server 506 (e.g., the scheduler 516 and/or the controller 518) of FIG. 5.

The circuit/module for receiving 1220 may include circuitry and/or programming (e.g., code for receiving 1228 stored on the storage medium 1204) adapted to perform several functions relating to, for example, receiving information. In some aspects, this information may include data. In some aspects, this information may include delay bound information associated with the data. In some implementations, the circuit/module for receiving 1220 receives information (e.g., from the communication interface 1202 or some other component of the apparatus 1200), processes (e.g., decodes) the information, and sends the information to another component of the apparatus 1200 (e.g., the memory device 1208 or some other component). In some implementations, the circuit/module for receiving 1220 is or includes a receiver. In some implementations, the communication interface 1202 includes the circuit/module for receiving 1220 and/or the code for receiving 1228. In some implementations, the circuit/module for receiving 1220 is configured to control the communication interface 1202 (e.g., a transceiver or a receiver) to receive the information.

The circuit/module for generating 1222 may include circuitry and/or programming (e.g., code for generating 1230 stored on the storage medium 1204) adapted to perform several functions relating to, for example, generating a response to data. In some implementations, the circuit/module for generating 1222 obtains the data (e.g., from the communication interface 1202, the memory device 1208, or some other component of the apparatus 1200), processes the data to obtain a response, and sends the response to another component of the apparatus 1200 (e.g., the memory device 1208 or some other component). In some implementations, the circuit/module for generating 1222 determines delay bound information. For example, the circuit/module for generating 1222 may obtain first delay bound information (and, optionally, other information, e.g., delay associated with transmission of data). The circuit/module for generating 1222 may obtain this information, for example, from the communication interface 1202, the memory device 1208, the circuit/module for receiving 1220, or some other component of the apparatus 1200. The circuit/module for generating 1222 processes this information to generate second delay bound information (e.g., as discussed herein). The circuit/module for generating 1222 then sends the second delay bound information to another component of the apparatus 1200 (e.g., the memory device 1208, the circuit/module for scheduling 1224, or some other component).

The circuit/module for scheduling 1224 may include circuitry and/or programming (e.g., code for scheduling 1232 stored on the storage medium 1204) adapted to perform several functions relating to, for example, scheduling transmission of a response based on the delay bound information. In some implementations, the circuit/module for scheduling 1224 obtains the delay bound information (e.g., from the communication interface 1202, the memory device 1208, or some other component of the apparatus 1200), processes the delay bound information to determine the amount of time left to send the response or the deadline for receipt of the response. The circuit/module for scheduling 1224 may then determine a schedule for transmitting the response based on the results of this processing and send the schedule to another component of the apparatus 1200 (e.g., the memory device 1208, the communication interface 1202, or some other component).

The circuit/module for transmitting 1226 may include circuitry and/or programming (e.g., code for transmitting 1234 stored on the storage medium 1204) adapted to perform several functions relating to, for example, transmitting (e.g., sending) information. In some aspects, this information may include data. In some aspects, this information may include delay bound information associated with the data. In some aspects, this information may include a response. In some implementations, the circuit/module for transmitting 1226 receives information (e.g., from a component of the apparatus 1200), processes (e.g., encodes) the information, and sends the information to another component (e.g., the communication interface 1202) that will transmit the information. In some implementations, the circuit/module for transmitting 1226 is or includes a transmitter. In some implementations, the communication interface 1202 includes the circuit/module for transmitting 1226 and/or the code for transmitting 1234. In some implementations, the circuit/module for transmitting 1226 is configured to control the communication interface 1202 (e.g., a transceiver or a transmitter) to transmit the information.

As mentioned above, programming stored by the storage medium 1204, when executed by the processor 1210, causes the processor 1210 to perform one or more of the various functions and/or process operations described herein. For example, the storage medium 1204 may include one or more of the code for receiving 1228, the code for generating 1230, the code for scheduling 1232, or the code for transmitting 1234.

Example Processes

Figure 13:
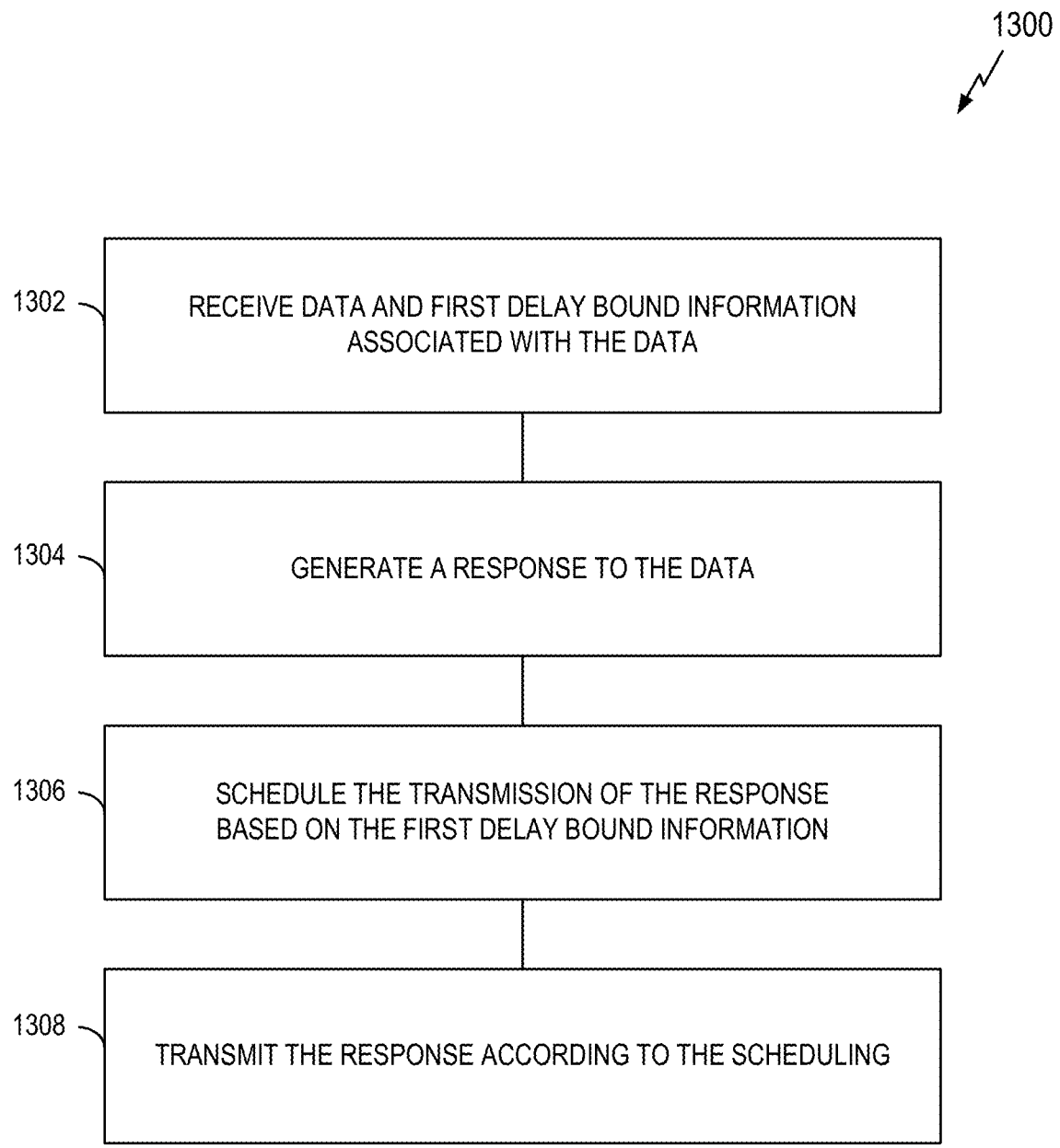
FIG. 13 is a flow diagram illustrating an example of a process for scheduling a response in accordance with some aspects of the disclosure.

FIG. 13 illustrates a scheduling process 1300 in accordance with some aspects of the disclosure. The process 1300 may take place within a processing circuit (e.g., the processor 1210 of FIG. 12), which may be located in a base station, an access terminal, or some other suitable apparatus. In some aspects, the process 1300 may be performed by a scheduling entity (e.g., a scheduler). Of course, in various aspects within the scope of the disclosure, the process 1300 may be implemented by any suitable apparatus capable of supporting scheduling-related operations.

At block 1302, an apparatus (e.g., a scheduler) receives data and first delay bound information associated with the data. In some implementations, the circuit/module for receiving 1220 of FIG. 12 performs the operations of block 1302. In some implementations, the code for receiving 1228 of FIG. 12 is executed to perform the operations of block 1302.

The first delay bound information may take different forms in different scenarios. In some aspects, the first delay bound information may be based on a round-trip-time associated with the data and a response. In some aspects, the first delay bound information may indicate an amount of time remaining within a round-trip time associated with the data and a response. In some aspects, the first delay bound information may indicate an elapsed time associated with transmission of the data. The elapsed time may be further associated with processing of the data. In some aspects, the first delay bound information may indicate a deadline associated with a response.

At block 1304, the apparatus generates a response to the data received at block 1302. In some aspects, the generation of the response includes processing the data. In some implementations, the circuit/module for generating 1222 of FIG. 12 performs the operations of block 1304. In some implementations, the code for generating 1230 of FIG. 12 is executed to perform the operations of block 1304.

At block 1306, the apparatus schedules the transmission of the response (generated at block 1304) based on the first delay bound information received at block 1302. In some aspects, the scheduling of the transmission of the response may be further based on a round-trip-time associated with the data and the response. In some implementations, the circuit/module for scheduling 1224 of FIG. 12 performs the operations of block 1306. In some implementations, the code for scheduling 1232 of FIG. 12 is executed to perform the operations of block 1306.

At block 1308, the apparatus transmits the response according to the scheduling of block 1306. In some implementations, the circuit/module for transmitting 1226 of FIG. 12 performs the operations of block 1308. In some implementations, the code for transmitting 1234 of FIG. 12 is executed to perform the operations of block 1308.

The data and response may be sent over different hops (e.g., in different directions over the same path, or over different paths). For example, the data may be received on a first communication hop and the response transmitted on a second communication hop. Moreover, a scheduler for the first communication hop may be controlled independently of a scheduler for the second communication hop.

The data and the first delay bound information may be communicated in different ways. For example, the data may be received via a data channel, while the first delay bound information may be received via a control channel. As another example, the first delay bound information may be received via a packet that includes the data. As yet another example, the first delay bound information may be received via an application program interface.

Figure 14:
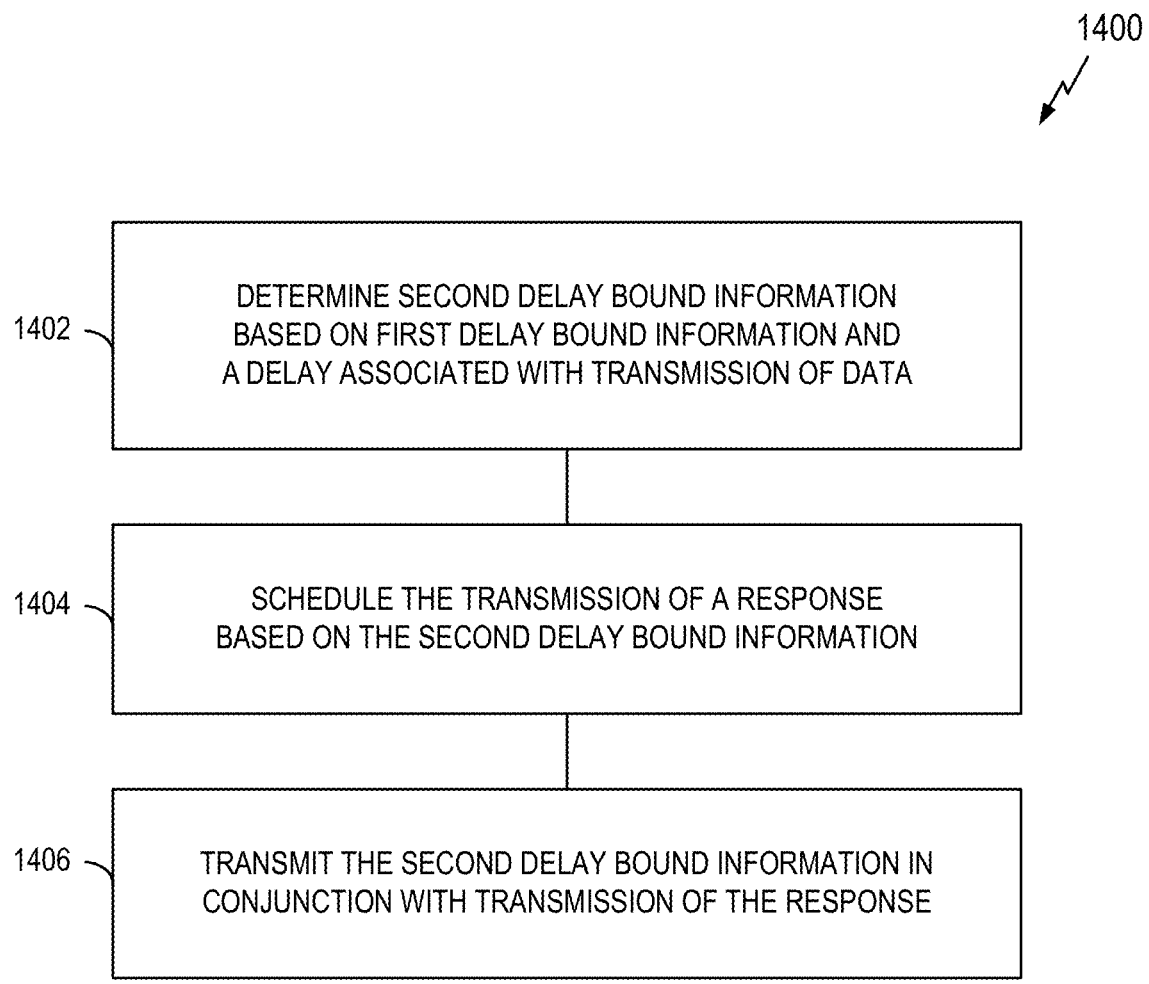
FIG. 14 is a flow diagram illustrating an example of a process involving the transmission of delay bound information in accordance with some aspects of the disclosure.

FIG. 14 illustrates a scheduling process 1400 in accordance with some aspects of the disclosure. In some aspects, the process 1400 may be performed in conjunction with (e.g., as part of or in addition to) the process 1300 of FIG. 13. The process 1400 may take place within a processing circuit (e.g., the processor 1210 of FIG. 12), which may be located in a base station, an access terminal, or some other suitable apparatus. In some aspects, the process 1400 may be performed by a scheduling entity (a scheduler). Of course, in various aspects within the scope of the disclosure, the process 1400 may be implemented by any suitable apparatus capable of supporting scheduling-related operations.

At block 1402, an apparatus (e.g., a scheduler) determines second delay bound information based on first delay bound information and a delay associated with transmission of data. In some aspects, the determination of the second delay bound information may be based on an amount of time associated with processing of the data. For example, the generation of a response may include processing received data. In some implementations, the circuit/module for generating 1222 of FIG. 12 performs the operations of block 1402. In some implementations, the code for generating 1230 of FIG. 12 is executed to perform the operations of block 1402.

At block 1404, the apparatus schedules the transmission of a response based on the second delay bound information determined at block 1402. Thus, in some aspects, the operations of block 1402 and 1404 may correspond to the operations of block 1306 of FIG. 13. In some implementations, the circuit/module for scheduling 1224 of FIG. 12 performs the operations of block 1404. In some implementations, the code for scheduling 1232 of FIG. 12 is executed to perform the operations of block 1404.

At block 1406, the apparatus transmits the second delay bound information in conjunction with transmission of the response. In some implementations, the circuit/module for transmitting 1226 of FIG. 12 performs the operations of block 1308. In some implementations, the code for transmitting 1234 of FIG. 12 is executed to perform the operations of block 1308.

The response and the second delay bound information may be sent in different ways. For example, the response may be transmitted via a data channel, while the second delay bound information may be transmitted via a control channel. As another example, the second delay bound information may be transmitted via a packet that includes the response. As yet another example, the second delay bound information may be transmitted via an application program interface.

Example Apparatus

Figure 15:
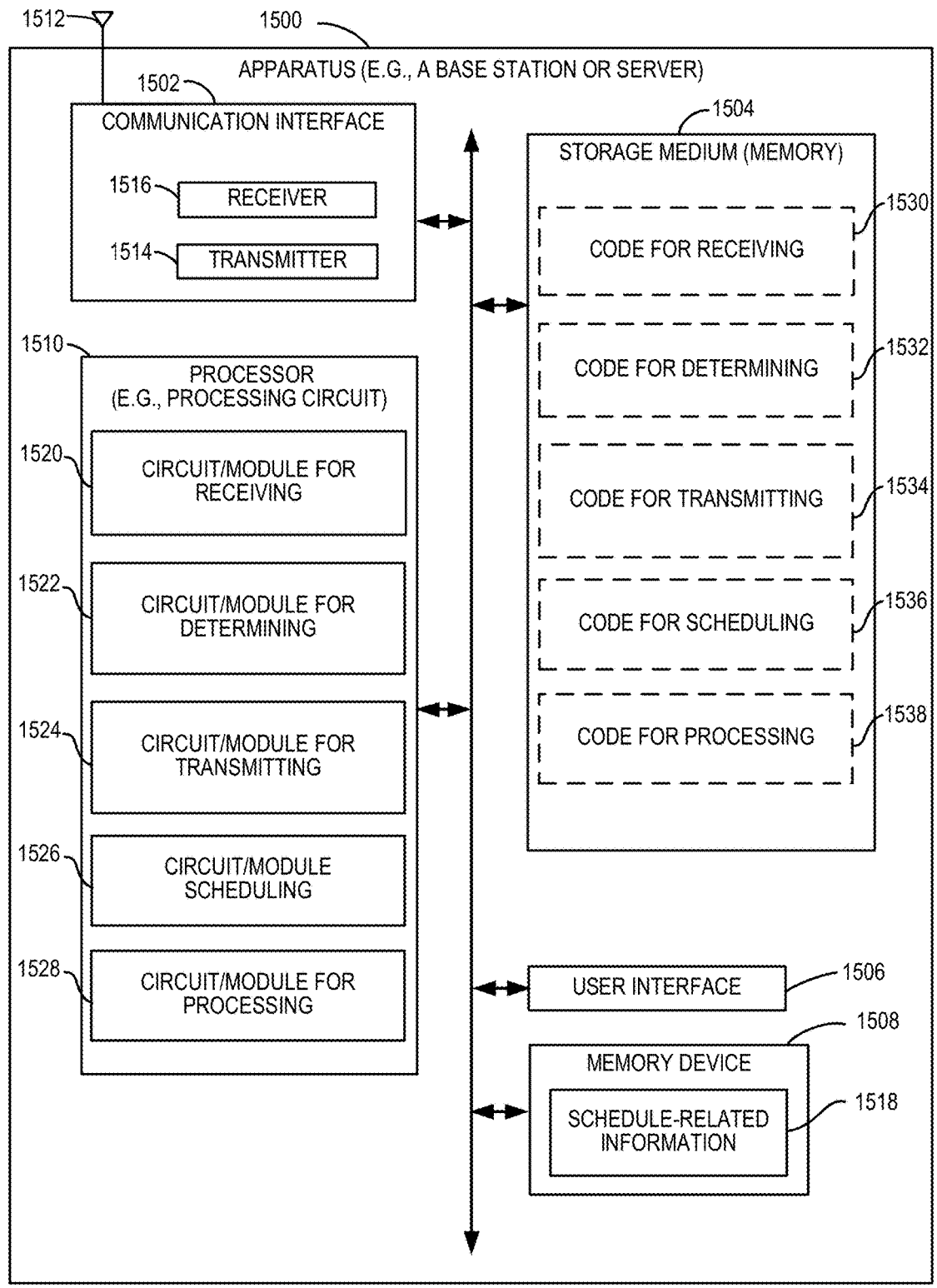
FIG. 15 is a block diagram of another example hardware implementation for an apparatus (e.g., an electronic device) that can support scheduling in accordance with some aspects of the disclosure.

FIG. 15 is an illustration of an apparatus 1500 that may support scheduling according to one or more aspects of the disclosure. In some aspects, the apparatus could embody or be implemented within a base station, a controller, a relay node, a server, or a scheduler (e.g., the base station 104 or the controller 106 of FIG. 1, the base station 304 of FIG. 3, the base station 404 or the relay node 406 of FIG. 4, or the base station 504 or the relay node/server 506 of FIG. 5). The apparatus 1500 could embody or be implemented within a data source, a mobile device, an access point, or some other type of device that supports wireless communication. In various implementations, the apparatus 1500 could embody or be implemented within a sensor, a manufacturing device, a drone, an access terminal, an access point, or some other type of device. In various implementations, the apparatus 1500 could embody or be implemented within a mobile phone, a smart phone, a tablet, a portable computer, a server, a personal computer, a sensor, an entertainment device, a medical device, or any other electronic device having circuitry.

The apparatus 1500 includes a communication interface 1502 (e.g., at least one transceiver), a storage medium 1504, a user interface 1506, a memory device 1508 (e.g., storing schedule-related information 1518), and a processor 1510 (e.g., a processing circuit). In various implementations, the user interface 1506 may include one or more of: a keypad, a display, a speaker, a microphone, a touchscreen display, of some other circuitry for receiving an input from or sending an output to a user. The communication interface 1502 may be coupled to one or more antennas 1512, and may include a transmitter 1514 and a receiver 1516. In general, the components of FIG. 15 may be similar to corresponding components of the apparatus 1200 of FIG. 12.

According to one or more aspects of the disclosure, the processor 1510 may be adapted to perform any or all of the features, processes, functions, operations and/or routines for any or all of the apparatuses described herein. For example, the processor 1510 may be configured to perform any of the steps, functions, and/or processes described with respect to FIGS. 1-11 and 16. As used herein, the term "adapted" in relation to the processor 1510 may refer to the processor 1510 being one or more of configured, employed, implemented, and/or programmed to perform a particular process, function, operation and/or routine according to various features described herein.

The processor 1510 may be a specialized processor, such as an application specific integrated circuit (ASIC) that serves as a means for (e.g., structure for) carrying out any one of the operations described in conjunction with FIGS. 1-11 and 16. The processor 1510 may serve as one example of a means for transmitting and/or a means for receiving. In various implementations, the processor 1510 may incorporate the functionality of the base station 104 (e.g., the scheduler 120) or the controller 106 of FIG. 1, the base station 304 (e.g., the scheduler 310) of FIG. 3, the base station 404 (e.g., the scheduler 412) or the relay node 406 (e.g., the scheduler 416) of FIG. 4, or the base station 504 (e.g., the scheduler 512 and/or the scheduler 522) or the relay node/server 506 (e.g., the scheduler 516 and/or the controller 518) of FIG. 5.

According to at least one example of the apparatus 1500, the processor 1510 may include one or more of a circuit/module for receiving 1520, a circuit/module for determining 1522, a circuit/module for transmitting 1524, a circuit/module for scheduling 1526, or a circuit/module for processing 1528. In various implementations, the circuit/module for determining 1522, the circuit/module for transmitting 1524, the circuit/module for scheduling 1526, or the circuit/module for processing 1528 may correspond, at least in part, to the base station 104 (e.g., the scheduler 120) or the controller 106 of FIG. 1, the base station 304 (e.g., the scheduler 310) of FIG. 3, the base station 404 (e.g., the scheduler 412) or the relay node 406 (e.g., the scheduler 416) of FIG. 4, or the base station 504 (e.g., the scheduler 512 and/or the scheduler 522) or the relay node/server 506 (e.g., the scheduler 516 and/or the controller 518) of FIG. 5.

The circuit/module for receiving 1520 may include circuitry and/or programming (e.g., code for receiving 1530 stored on the storage medium 1504) adapted to perform several functions relating to, for example, receiving information. In some aspects, this information may include data. In some aspects, this information may include delay bound information associated with the data. In some implementations, the circuit/module for receiving 1520 receives information (e.g., from the communication interface 1502 or some other component of the apparatus 1500), processes (e.g., decodes) the information, and sends the information to another component of the apparatus 1500 (e.g., the memory device 1508 or some other component). In some implementations, the circuit/module for receiving 1520 is or includes a receiver. In some implementations, the communication interface 1502 includes the circuit/module for receiving 1520 and/or the code for receiving 1530. In some implementations, the circuit/module for receiving 1520 is configured to control the communication interface 1502 (e.g., a transceiver or a receiver) to receive the information.

The circuit/module for determining 1522 may include circuitry and/or programming (e.g., code for determining 1532 stored on the storage medium 1504) adapted to perform several functions relating to, for example, determining delay bound information. In some implementations, the circuit/module for determining 1522 obtains first delay bound information (and, optionally, other information, e.g., delay associated with transmission of data). The circuit/module for determining 1522 may obtain this information, for example, from the communication interface 1502, the memory device 1508, the circuit/module for receiving 1520, or some other component of the apparatus 1500. The circuit/module for determining 1522 processes this information to generate second delay bound information (e.g., as discussed herein). The circuit/module for determining 1522 then sends the second delay bound information to another component of the apparatus 1500 (e.g., the memory device 1508, the circuit/module for transmitting 1524, or some other component).

The circuit/module for transmitting 1524 may include circuitry and/or programming (e.g., code for transmitting 1534 stored on the storage medium 1504) adapted to perform several functions relating to, for example, transmitting (e.g., sending) information. In some aspects, this information may include data. In some aspects, this information may include delay bound information associated with the data. In some aspects, this information may include a response. In some implementations, the circuit/module for transmitting 1524 receives information (e.g., from the memory device 1508, the circuit/module for determining 1522, or some other component of the apparatus 1500), processes (e.g., encodes) the information, and sends the information to another component (e.g., the communication interface 1502) that will transmit the information. In some implementations, the circuit/module for transmitting 1526 is or includes a transmitter. In some implementations, the communication interface 1502 includes the circuit/module for transmitting 1524 and/or the code for transmitting 1534. In some implementations, the circuit/module for transmitting 1524 is configured to control the communication interface 1502 (e.g., a transceiver or a transmitter) to transmit the information.

The circuit/module for scheduling 1526 may include circuitry and/or programming (e.g., code for scheduling 1536 stored on the storage medium 1504) adapted to perform several functions relating to, for example, scheduling transmission of data based on delay bound information. In some implementations, the circuit/module for scheduling 1524 obtains the delay bound information (e.g., from the communication interface 1502, the memory device 1508, the circuit/module for determining 1522, or some other component of the apparatus 1500), processes the delay bound information to determine the amount of time left to send the response or the deadline for receipt of the response. The circuit/module for scheduling 1524 may then determine a schedule for transmitting the response based on the results of this processing (e.g., as discussed herein). The circuit/module for scheduling 1526 then sends the schedule to another component of the apparatus 1500 (e.g., the memory device 1508, the communication interface 1502, or some other component).

The circuit/module for processing 1528 may include circuitry and/or programming (e.g., code for processing 1538 stored on the storage medium 1504) adapted to perform several functions relating to, for example, processing first data to generate second data. Initially, the circuit/module for processing 1528 obtains the first data (and, optionally, other information). The circuit/module for processing 1528 may obtain this information, for example, from the communication interface 1502, the memory device 1508, the circuit/module for receiving 1520, or some other component of the apparatus 1500. The circuit/module for processing 1528 then processes this data to generate the second data (e.g., as discussed herein). For example, the circuit/module for processing 1528 may generate a response to the first data. The circuit/module for processing 1528 then sends the second data to another component of the apparatus 1500 (e.g., the memory device 1508, the communication interface 1502, or some other component).

As mentioned above, programming stored by the storage medium 1504, when executed by the processor 1510, causes the processor 1510 to perform one or more of the various functions and/or process operations described herein. For example, the storage medium 1504 may include one or more of the code for receiving 1530, the code for determining 1532, the code for transmitting 1534, the code for scheduling 1536, or the code for processing 1538.

Example Process

Figure 16:
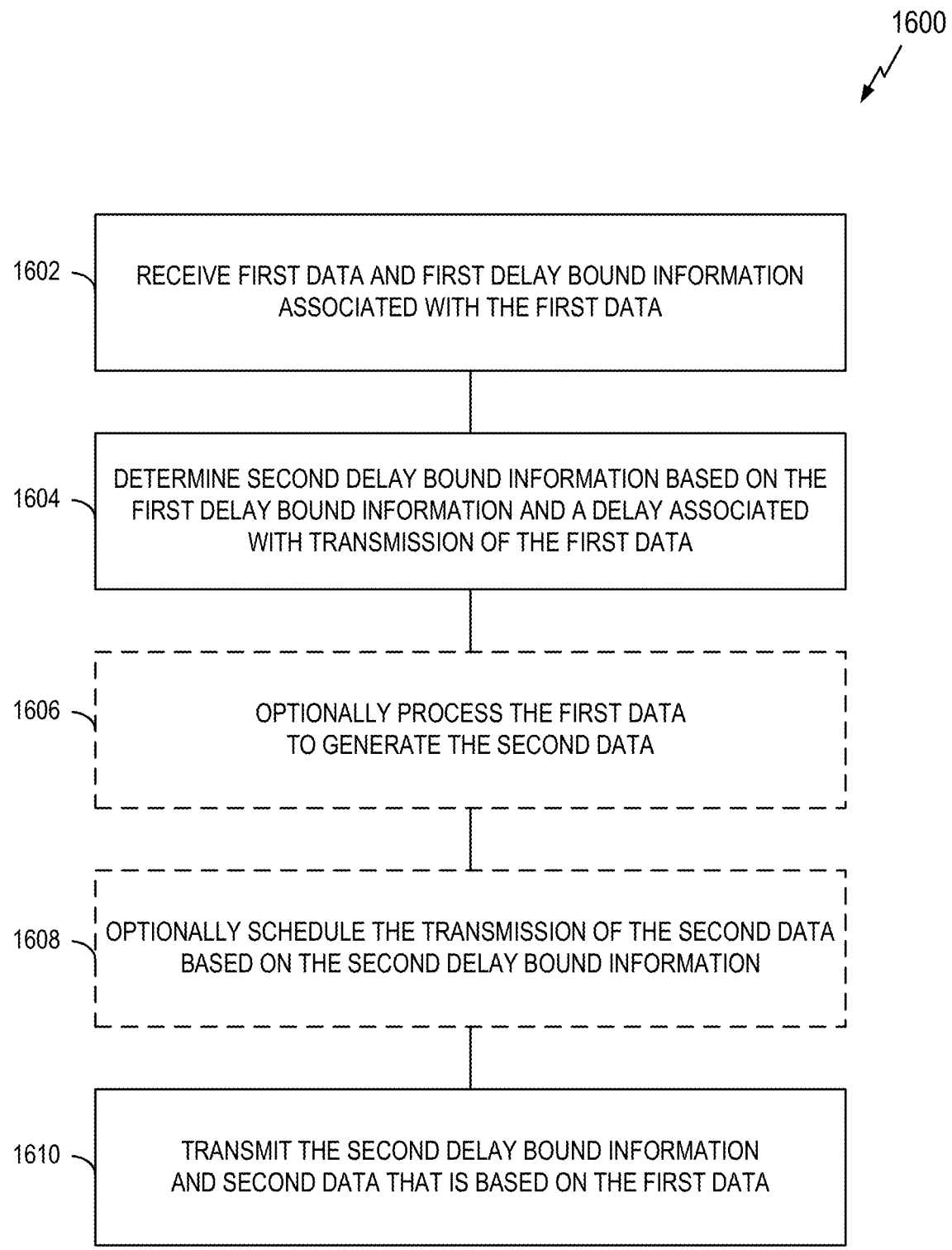
FIG. 16 is a flow diagram illustrating an example of a process that uses delay bound information in accordance with some aspects of the disclosure.

FIG. 16 illustrates a scheduling process 1600 in accordance with some aspects of the disclosure. The process 1600 may take place within a processing circuit (e.g., the processor 1510 of FIG. 15), which may be located in a base station, an access terminal, or some other suitable apparatus. In some aspects, the process 1600 may be performed by a scheduling entity (e.g., a scheduler). Of course, in various aspects within the scope of the disclosure, the process 1600 may be implemented by any suitable apparatus capable of supporting scheduling-related operations.

At block 1602, an apparatus (e.g., a scheduler) receives first data and first delay bound information associated with the first data. In some implementations, the circuit/module for receiving 1520 of FIG. 15 performs the operations of block 1602. In some implementations, the code for receiving 1530 of FIG. 15 is executed to perform the operations of block 1602.

The first delay bound information may take different forms in different scenarios. For example, the first delay bound information may indicate an amount of time elapsed for an end-to-end delay bound associated with the first data. As another example, the first delay bound information may indicate an end-to-end delay bound deadline associated with the first data.

In some aspects, the first delay bound information may indicate an amount of time remaining for an end-to-end delay bound associated with the first data. The end-to-end delay bound may include, for example, a round-trip delay bound or a multi-hop delay bound.

At block 1604, the apparatus determines second delay bound information based on the first delay bound information and a delay associated with transmission of the first data. In some implementations, the circuit/module for determining 1522 of FIG. 15 performs the operations of block 1604. In some implementations, the code for determining 1532 of FIG. 15 is executed to perform the operations of block 1604.

In some scenarios, the determination of the second delay bound information may include: determining a current time; and determining an amount of time remaining for the end-to-end delay bound based on a deadline and the current time.

At optional block 1606, the apparatus may process the first data to generate the second data. In this case, the determination of the second delay bound information may be further based on an amount of time associated with the processing of the first data. In some implementations, the circuit/module for processing 1528 of FIG. 15 performs the operations of block 1606. In some implementations, the code for processing 1538 of FIG. 15 is executed to perform the operations of block 1606.

At optional block 1608, the apparatus may schedule the transmission of the second data based on the second delay bound information. In some implementations, the circuit/module for scheduling 1526 of FIG. 15 performs the operations of block 1608. In some implementations, the code for scheduling 1536 of FIG. 15 is executed to perform the operations of block 1608.

At block 1610, the apparatus transmits second data that is based on the first data and transmits the second delay bound information. In some implementations, the circuit/module for transmitting 1524 of FIG. 15 performs the operations of block 1610. In some implementations, the code for transmitting 1534 of FIG. 15 is executed to perform the operations of block 1610.

The second data may take various forms. In some aspects, the second data may include the first data. In some aspects, the second data may be a copy of the first data. In some aspects, the second data may be a response that is generated based on the first data.

The first data and the second data may be sent over different hops. For example, the first data may be received on a first communication hop and the second data transmitted on a second communication hop. Moreover, a scheduler for the first communication hop may be controlled independently of a scheduler for the second communication hop.

The first data and the first delay bound information may be communicated in different ways. For example, the first data may be received via a data channel, while the first delay bound information may be received via a control channel. As another example, the first delay bound information may be received via a packet that includes the first data. As yet another example, the first delay bound information may be received via an application program interface.

The second data and the second delay bound information may be communicated in different ways. For example, the second data may be transmitted via a data channel, while the second delay bound information may be transmitted via a control channel. As another example, the second delay bound information may be transmitted via a packet that includes the second data. As yet another example, the second delay bound information may be received via an application program interface.

Example Apparatus

Figure 17:
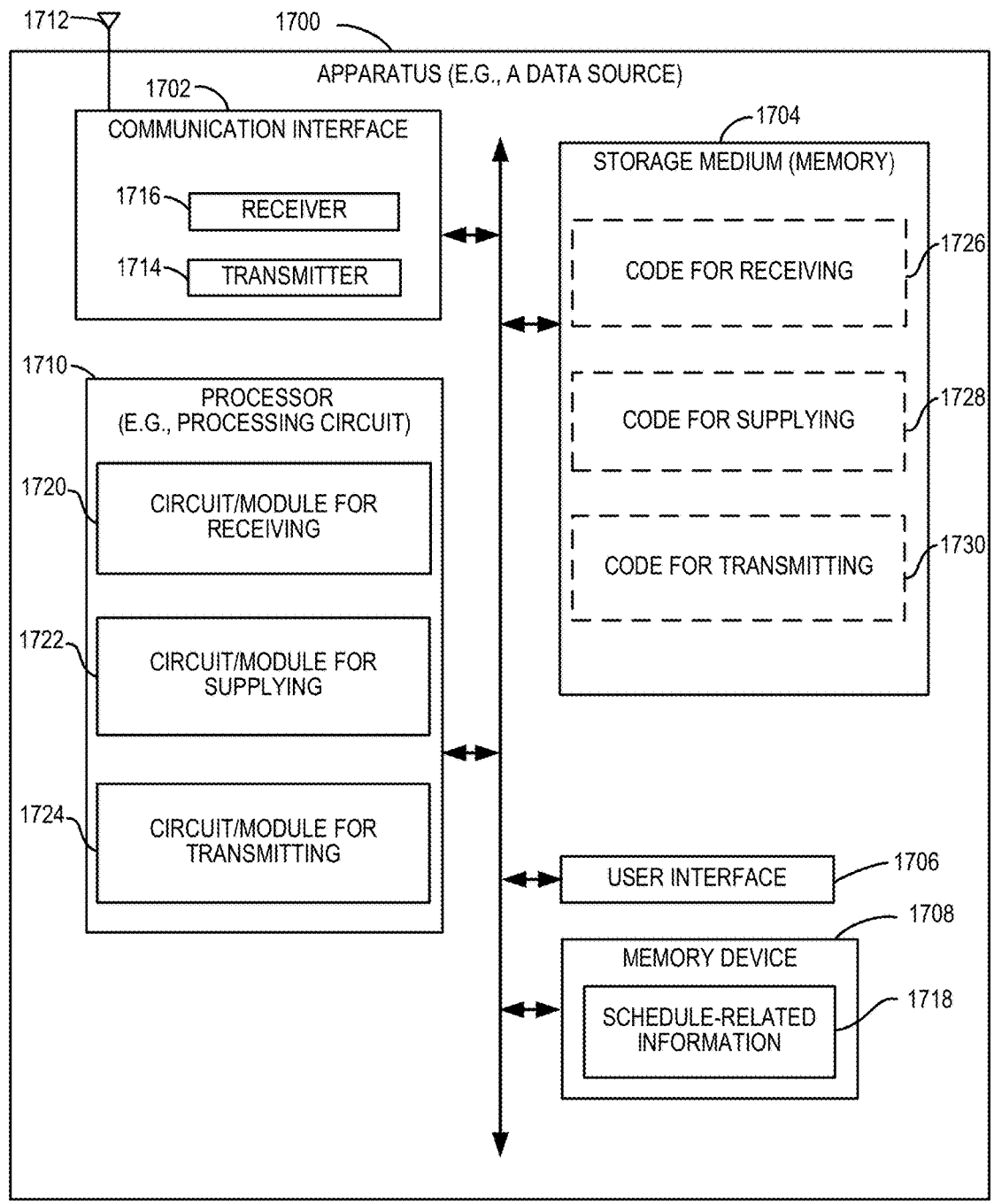
FIG. 17 is a block diagram of another example hardware implementation for an apparatus (e.g., an electronic device) that can support scheduling in accordance with some aspects of the disclosure.

FIG. 17 is an illustration of an apparatus 1700 that may support scheduling according to one or more aspects of the disclosure. In some aspects, the apparatus could embody or be implemented within a data source (e.g., the data source 102 of FIG. 1, the data source 302 of FIG. 3, the data source 402 of FIG. 4, or the data source 502 of FIG. 5). The apparatus 1700 could embody or be implemented within a mobile device, a base station, or some other type of device that supports wireless communication. In various implementations, the apparatus 1700 could embody or be implemented within a sensor, a manufacturing device, a drone, an access terminal, an access point, or some other type of device. In various implementations, the apparatus 1700 could embody or be implemented within a mobile phone, a smart phone, a tablet, a portable computer, a server, a personal computer, a sensor, an entertainment device, a medical device, or any other electronic device having circuitry.

The apparatus 1700 includes a communication interface 1702 (e.g., at least one transceiver), a storage medium 1704, a user interface 1706, a memory device 1708 (e.g., storing schedule-related information 1718), and a processor 1710 (e.g., a processing circuit). In various implementations, the user interface 1706 may include one or more of: a keypad, a display, a speaker, a microphone, a touchscreen display, of some other circuitry for receiving an input from or sending an output to a user. The communication interface 1702 may be coupled to one or more antennas 1712, and may include a transmitter 1714 and a receiver 1716. In general, the components of FIG. 17 may be similar to corresponding components of the apparatus 1200 of FIG. 12.

According to one or more aspects of the disclosure, the processor 1710 may be adapted to perform any or all of the features, processes, functions, operations and/or routines for any or all of the apparatuses described herein. For example, the processor 1710 may be configured to perform any of the steps, functions, and/or processes described with respect to FIGS. 1-11 and 18. As used herein, the term "adapted" in relation to the processor 1710 may refer to the processor 1710 being one or more of configured, employed, implemented, and/or programmed to perform a particular process, function, operation and/or routine according to various features described herein.

The processor 1710 may be a specialized processor, such as an application specific integrated circuit (ASIC) that serves as a means for (e.g., structure for) carrying out any one of the operations described in conjunction with FIGS. 1-11 and 18. The processor 1710 may serve as one example of a means for transmitting and/or a means for receiving. In various implementations, the processor 1710 may incorporate the functionality of the data source 102 of FIG. 1, the data source 302 of FIG. 3, the data source 402 of FIG. 4, or the data source 502 of FIG. 5.

According to at least one example of the apparatus 1700, the processor 1710 may include one or more of a circuit/module for receiving 1720, a circuit/module for supplying 1722, or a circuit/module for transmitting 1724. In various implementations, the circuit/module for receiving 1720, the circuit/module for supplying 1722, or the circuit/module for transmitting 1724 may correspond, at least in part, to the data source 102 of FIG. 1, the data source 302 of FIG. 3, the data source 402 of FIG. 4, or the data source 502 of FIG. 5.

The circuit/module for receiving 1720 may include circuitry and/or programming (e.g., code for receiving 1726 stored on the storage medium 1704) adapted to perform several functions relating to, for example, receiving information. In some aspects, this information may include data. In some aspects, this information may include delay bound information associated with the data. In some implementations, the circuit/module for receiving 1720 receives information (e.g., from the communication interface 1702 or some other component of the apparatus 1700), processes (e.g., decodes) the information, and sends the information to another component of the apparatus 1700 (e.g., the memory device 1708 or some other component). In some implementations, the circuit/module for receiving 1720 is or includes a receiver. In some implementations, the communication interface 1702 includes the circuit/module for receiving 1720 and/or the code for receiving 1726. In some implementations, the circuit/module for receiving 1720 is configured to control the communication interface 1702 (e.g., a transceiver or a receiver) to receive the information.

The circuit/module for supplying 1722 may include circuitry and/or programming (e.g., code for supplying 1728 stored on the storage medium 1704) adapted to perform several functions relating to, for example, supplying data. In some implementations, supplying data involves generates the data. In some implementations, supplying data involves obtaining the data from another component. In some implementations, the circuit/module for supplying 1722 obtains information (e.g., from the communication interface 1702, the memory device 1708, or some other component of the apparatus 1700), processes the information to generate the data to be supplied, and sends the data to another component of the apparatus 1700 (e.g., the memory device 1708 or some other component).

The circuit/module for transmitting 1724 may include circuitry and/or programming (e.g., code for transmitting 1730 stored on the storage medium 1704) adapted to perform several functions relating to, for example, transmitting (e.g., sending) information. In some aspects, this information may include data. In some aspects, this information may include delay bound information associated with the data. In some aspects, this information may include a response. In some implementations, the circuit/module for transmitting 1724 receives information (e.g., from a component of the apparatus 1700), processes (e.g., encodes) the information, and sends the information to another component (e.g., the communication interface 1702) that will transmit the information. In some implementations, the circuit/module for transmitting 1724 is or includes a transmitter. In some implementations, the communication interface 1702 includes the circuit/module for transmitting 1724 and/or the code for transmitting 1730. In some implementations, the circuit/module for transmitting 1724 is configured to control the communication interface 1702 (e.g., a transceiver or a transmitter) to transmit the information.

As mentioned above, programming stored by the storage medium 1704, when executed by the processor 1710, causes the processor 1710 to perform one or more of the various functions and/or process operations described herein. For example, the storage medium 1704 may include one or more of the code for receiving 1726, the code for supplying 1728, or the code for transmitting 1730.

Example Process

Figure 18:
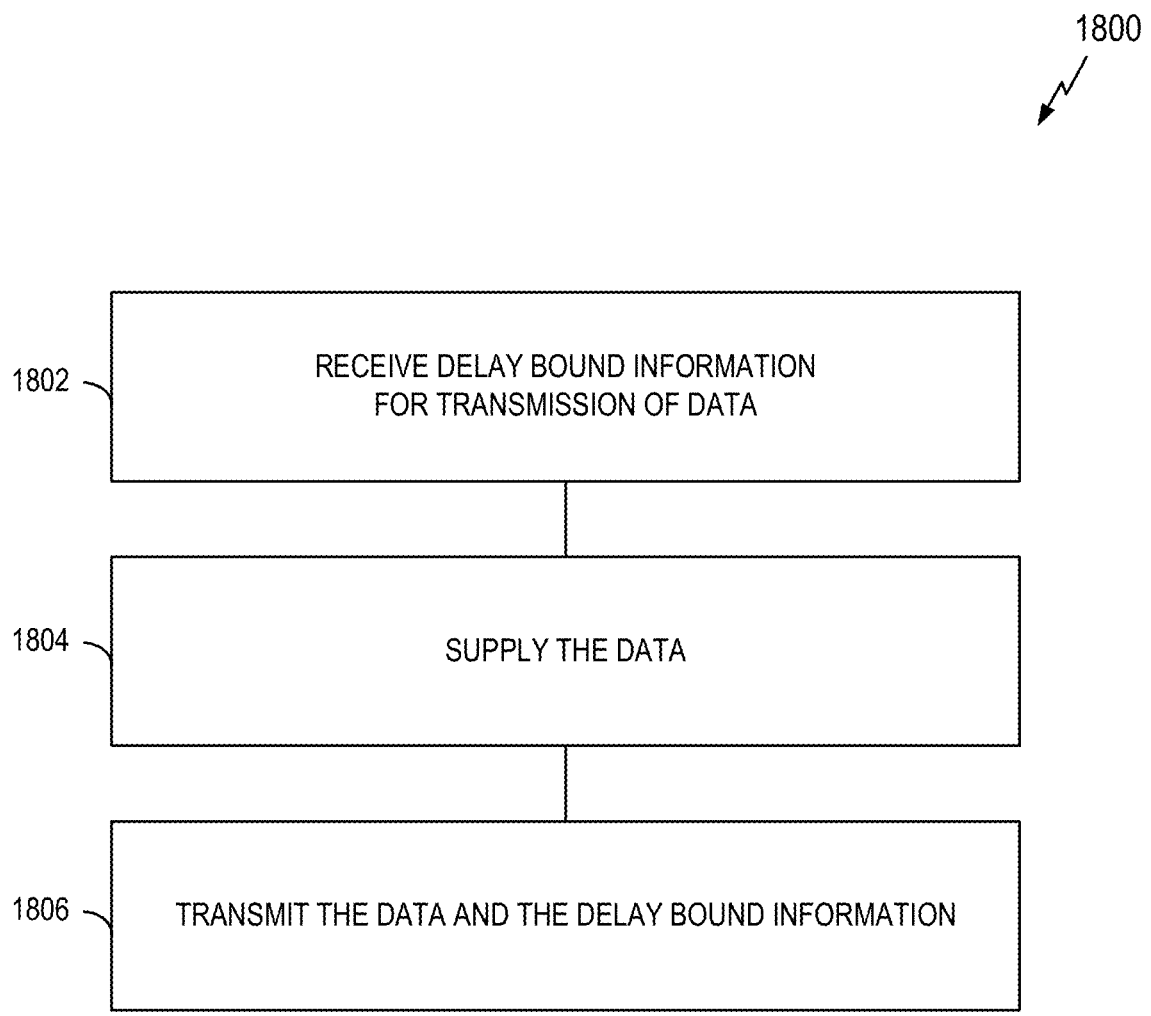
FIG. 18 is a flow diagram illustrating an example of a data transmission process in accordance with some aspects of the disclosure.

FIG. 18 illustrates a process 1800 for communicating data in accordance with some aspects of the disclosure. The process 1800 may take place within a processing circuit (e.g., the processor 1710 of FIG. 17), which may be located in a data source, an access terminal, a base station, or some other suitable apparatus. Of course, in various aspects within the scope of the disclosure, the process 1800 may be implemented by any suitable apparatus capable of supporting data communication-related operations.

At block 1802, an apparatus (e.g., a data source) receives delay bound information for transmission of data. In some implementations, the circuit/module for receiving 1720 of FIG. 17 performs the operations of block 1802. In some implementations, the code for receiving 1726 of FIG. 17 is executed to perform the operations of block 1802.

The delay bound information may take different forms in different scenarios. For example, the delay bound information may indicate an amount of time elapsed for an end-to-end delay bound associated with the data. As another example, the delay bound information may indicate an end-to-end delay bound deadline associated with the data.

In some aspects, the delay bound information may indicate an amount of time remaining for an end-to-end delay bound associated with the data. The end-to-end delay bound may include, for example, a round-trip delay bound or a multi-hop delay bound.

At block 1804, the apparatus supplies the data (e.g., generates the data, obtains the data from another component, etc.). In some implementations, the circuit/module for supplying 1722 of FIG. 17 performs the operations of block 1804. In some implementations, the code for supplying 1728 of FIG. 17 is executed to perform the operations of block 1804.

At block 1806, the apparatus transmits the data and the delay bound information. In some implementations, the circuit/module for transmitting 1724 of FIG. 17 performs the operations of block 1806. In some implementations, the code for transmitting 1730 of FIG. 17 is executed to perform the operations of block 1806.

The data and the delay bound information may be communicated in different ways. For example, the data may be transmitted via a data channel, while the delay bound information may be transmitted via a control channel. As another example, the delay bound information may be transmitted via a packet that includes the data. As yet another example, the delay bound information may be received via an application program interface.

Example Network

Figure 19:
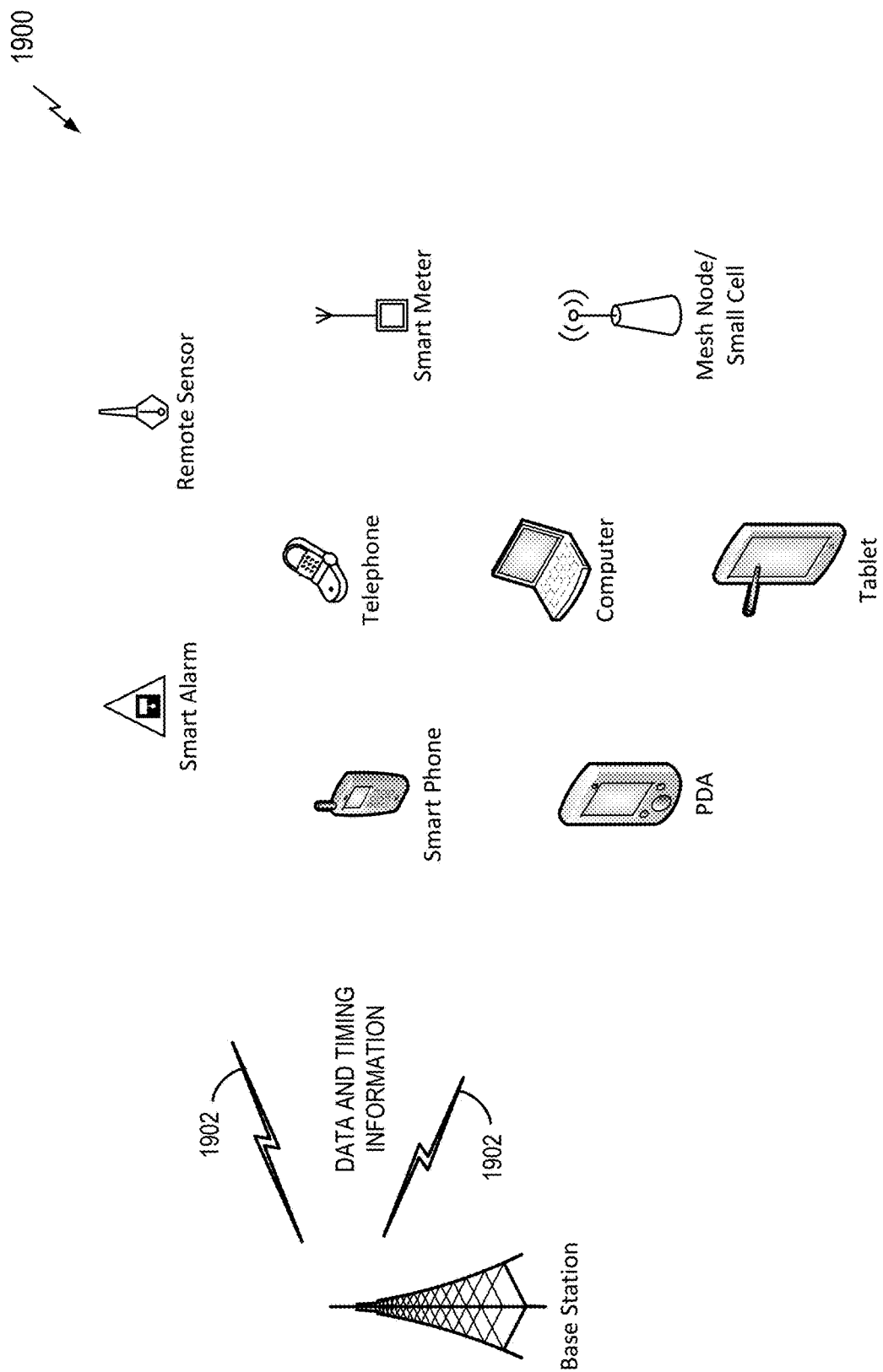
FIG. 19 is a schematic diagram of a wireless communication network within which one or more aspects of the disclosure may be implemented.

FIG. 19 is a schematic illustration of a wireless communication network 1900 including multiple communication entities as it may appear in some aspects of the disclosure. As indicated, some or all of the communication entities exchange data and timing information 1902 (e.g., delay bound information) in accordance with the teachings herein. As described herein, a wireless communication device (e.g., as illustrated in FIGS. 1-5) may reside in, or be a part of, a base station, a smart phone, a small cell, or other entity. Subordinate entities or mesh nodes may reside in, or be a part of, a smart alarm, a remote sensor, a smart phone, a telephone, a smart meter, a PDA, a personal computer, a mesh node, and/or a tablet computer. Of course, the illustrated devices or components are merely examples, and any suitable node or device may appear within a wireless communication network within the scope of the present disclosure.

Other Aspects

Of course, these examples are merely provided to illustrate certain concepts of the disclosure. Those of ordinary skill in the art will comprehend that these are merely exemplary in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover any of: a; b; c; a and b; a and c; b and c; a, b and c; 2a; 2b; 2c; 2A and b; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by an apparatus, comprising:
   receiving data and first delay bound information associated with the data;
   processing the data;
   generating a response to the data based on the processing of the data;
   determining a delay associated with transmission of the data;
   determining an amount of time associated with the processing of the data;
   determining second delay bound information based on the first delay bound information, the determined delay associated with transmission of the data, and the determined amount of time associated with the processing of the data;
   scheduling a transmission of the response based on the second delay bound information, wherein the scheduling comprises selecting between shortening a latency defined for the transmission and lengthening the latency defined for the transmission; and
   transmitting the response according to the scheduling.

2. The method of claim 1, wherein the scheduling of the transmission of the response is further based on a round-trip-time associated with the data and the response.

3. The method of claim 1, wherein the first delay bound information is based on a round-trip-time associated with the data and the response.

4. The method of claim 1, wherein the first delay bound information indicates an amount of time remaining within a round-trip time associated with the data and the response.

5. The method of claim 1, wherein the first delay bound information indicates an elapsed time associated with transmission of the data.

6. The method of claim 5, wherein the elapsed time is further associated with processing of the data.

7. The method of claim 1, wherein the first delay bound information indicates a deadline associated with the response.

8. The method of claim 1, wherein:
   the data is received on a first communication hop;
   the response is transmitted on a second communication hop; and
   a scheduler for the first communication hop is controlled independently of a scheduler for the second communication hop.

9. The method of claim 1, wherein:
   the data is received via a data channel; and
   the first delay bound information is received via a control channel.

10. The method of claim 1, wherein the first delay bound information is received via a packet that includes the data.

11. The method of claim 1, wherein the first delay bound information is received via an application program interface.

12. The method of claim 1, further comprising:
    transmitting the second delay bound information in conjunction with the transmission of the response.

13. The method of claim 12, wherein:
    the response is transmitted via a data channel; and
    the second delay bound information is transmitted via a control channel.

14. The method of claim 12, wherein the second delay bound information is transmitted via a packet that includes the response.

15. An apparatus for wireless communication comprising:
    a memory; and
    a processor coupled to the memory,
    the processor and the memory configured to:
      receive data and first delay bound information associated with the data;
      process the data;
      generate a response to the data based on the processing of the data;
      determine a delay associated with transmission of the data;
      determine an amount of time associated with the processing of the data;
      determine second delay bound information based on the first delay bound information, the determined delay associated with transmission of the data, and the determined amount of time associated with the processing of the data;
      schedule a transmission of the response based on the second delay bound information, wherein the scheduling comprises selecting between shortening a latency defined for the transmission and lengthening the latency defined for the transmission; and
      transmit the response according to the scheduling.

16. The apparatus of claim 15, wherein the scheduling of the transmission of the response is further based on a round-trip-time associated with the data and the response.

17. The apparatus of claim 15, wherein the first delay bound information is based on a round-trip-time associated with the data and the response.

18. The apparatus of claim 15, wherein the first delay bound information indicates an amount of time remaining within a round-trip time associated with the data and the response.

19. The apparatus of claim 15, wherein the first delay bound information indicates an elapsed time associated with transmission of the data.

20. The apparatus of claim 19, wherein the elapsed time is further associated with processing of the data.

21. The apparatus of claim 15, wherein the first delay bound information indicates a deadline associated with the response.

22. The apparatus of claim 15, wherein the first delay bound information is received via an application program interface.

23. The apparatus of claim 15, wherein the processor and the memory are further configured to:
transmit the second delay bound information in conjunction with the transmission of the response.

24. An apparatus for wireless communication comprising:
means for receiving data and first delay bound information associated with the data;
means for processing the data;
means for generating a response to the data based on the processing of the data;
means for determining a delay associated with transmission of the data;
means for determining an amount of time associated with the processing of the data;
means for determining second delay bound information based on the first delay bound information, the determined delay associated with transmission of the data, and the determined amount of time associated with the processing of the data;
means for scheduling a transmission of the response based on the second delay bound information, wherein the scheduling comprises selecting between shortening a latency defined for the transmission and lengthening the latency defined for the transmission; and
means for transmitting the response according to the scheduling.

25. The apparatus of claim 24, wherein the means for transmitting is further configured to:
transmit the second delay bound information in conjunction with the transmission of the response.

26. A non-transitory computer-readable medium storing computer-executable code for wireless communication by an apparatus including code to:
receive data and first delay bound information associated with the data;
process the data;
generate a response to the data based on the processing of the data;
determine a delay associated with transmission of the data;
determine an amount of time associated with the processing of the data;
determine second delay bound information based on the first delay bound information, the determined delay associated with transmission of the data, and the determined amount of time associated with the processing of the data;
schedule a transmission of the response based on the second delay bound information, wherein the scheduling comprises selecting between shortening a latency defined for the transmission and lengthening the latency defined for the transmission; and
transmit the response according to the scheduling.

* * * * *